United States Patent [19]

Yoshikawa

[11] Patent Number: 6,012,037
[45] Date of Patent: Jan. 4, 2000

[54] SCHEDULE MANAGEMENT APPARATUS

[75] Inventor: Kaeko Yoshikawa, Nara, Japan

[73] Assignee: Sharp Kabushiki Kaisha, Osaka, Japan

[21] Appl. No.: 08/835,880

[22] Filed: Apr. 8, 1997

[30]    Foreign Application Priority Data

Apr. 11, 1996 [JP] Japan .................................... 8-089757

[51] Int. Cl.⁷ .................................................. G06F 17/60
[52] U.S. Cl. ................................ 705/8; 708/163; 368/28
[58] Field of Search ................................... 705/8; 368/28

[56]              References Cited

U.S. PATENT DOCUMENTS

| 4,361,874 | 11/1982 | Yasuda ............................... 364/710.04 |
| 5,428,678 | 6/1995 | Fitzpatrick et al. ...................... 379/201 |
| 5,457,476 | 10/1995 | Jenson . | |

FOREIGN PATENT DOCUMENTS

| 57-3076 | 1/1982 | Japan . | |
| 5-174033 | 7/1993 | Japan . | |
| 0218258 | 4/1987 | United Kingdom ............... G06F 9/44 |
| 0342632 | 11/1989 | United Kingdom ............ G04G 11/00 |
| 0553588 | 8/1993 | United Kingdom ............... G06F 9/46 |
| 0557911 | 9/1993 | United Kingdom ............ G04G 15/00 |

OTHER PUBLICATIONS

Software you can bank on; personal–finance packages make most of your money. Computer Shopper, v16 n3 p508(80, Mar. 1996.

Day–Timer Technologies Debuts New, Web–Enabled Version of Day–Timer Organizer; Day–Timer Organizer 2.1 offers 50 + new features to make personal information management, website access and e–mail creation faster and easier. Business Wire, Aug. 5, 1996.

How do you manage? (five management software packages) . . . . Kawamoto, Wayne. Home Office Computing v13 n11 p94(4), Nov. 1995.

New For PCS: Time Management Software. Newbytes News Network, Apr. 29, 1991.

Calendar Creator Plus, Version 2.0, Title page, pp. ii, iii, pp. 1, 32–41 and Appendix A, pp. 238–241, 1993.

Introducing Microsoft Exchange, 5 pages including pp. 75 and 76, 1996.

*Selecting a Time Slot Makes Text Area Scroll*, IBM Technical Disclosure Bulletin, Mar. 1989, vol. 31, pp. 184–186.

*Graphical Indicator for Calendar Days That Have Out of Sync Data,* IBM Technical Disclosure Bulletin, Nov. 1992, vol. 35, pp. 375–377.

*Primary Examiner*—Allen R. MacDonald
*Assistant Examiner*—M. Irshadullah
*Attorney, Agent, or Firm*—Nixon & Vanderhye P.C.

[57]              ABSTRACT

A schedule management apparatus includes a term data input section for inputting a term data by designating a start day and an end day, a schedule input section for inputting a schedule corresponding to the term data inputted by the term data input section, a memory for storing the term data and the schedule in correspondence, a day designation section for designating a specific day, a retrieval section for retrieving, from the memory, a term data which includes the specific day designated by the day designation section, a schedule display section for displaying at least the start day and the end day of the term data retrieved by the retrieval section.

16 Claims, 19 Drawing Sheets

FIG.14

| | YEAR:1995 | | MAY | | | INPUT |
|---|---|---|---|---|---|---|
| SUN. | MON. | TUE. | WED. | THU. | FRI. | SAT. |
| 30 | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | 1 | 2 | 3 |
| 4 | 5 | 6 | 7 | 8 | 9 | 10 |

DAY OF THE WEEK | EACH | SET HOLIDAYS

FIG.15

SCHEDULE MANAGEMENT APPARATUS

BACKGROUND OF THE INVENTION

1. Field of the Invention

The present invention relates to a schedule management apparatus for storing and displaying a schedule.

2. Description of the Related Arts

Conventional schedule management apparatus are disclosed, for example, in Japanese Laid-open Patent Publication (Kokai) No. Hei 5(1993)-174033 and Japanese Laid-open Patent Publication (Kokai) No. Sho 57(1982)-3076.

Such a schedule management apparatus often performs a function of displaying various images with a single input by setting various display formats after a date and a plan data are inputted in a step for inputting a schedule having a predetermined term.

However, no conventional schedule management apparatus performed a function of displaying the term and contents of the schedule without setting a format in a display screen for a day or for a week which overlaps with the inputted schedule.

In a conventional method, it was possible to set a specific day by designating coordinates on a screen where a calendar is displayed (by pointing with a pen on a tablet screen where dates of the calendar are displayed). However, no conventional schedule management apparatus performed a function of calculating the term of a schedule to display the dates of the term in reverse video when the term from the start day to the end day are inputted as continuous coordinates in setting the schedule.

Moreover, since it was impossible to set the term for a schedule by simply designating coordinates in inputting the term that lies across a plurality of months, no conventional schedule management apparatus performed a function of setting a term that lies across a plurality of months by designation of continuous coordinates at a time.

Some conventional schedule management apparatus can perform a function of inputting, at a time, a term including a plurality of set days. Other conventional schedule management apparatus can perform a function of inputting, at a time, the same plan for certain prescribed days of the week for an indefinite period of time.

However, if the same plan existed on certain prescribed days of the week (Here, a day of the week means one of the seven days in a week, i.e. Sun., Mon., . . . , or Sat.) for a definite period of time, it was not possible to input the schedule at a time in a conventional schedule management apparatus. Also, when a term schedule is to be inputted by designation of continuous coordinates (pointing on dates with a pen) in such a conventional schedule management apparatus, no conventional schedule management apparatus performed a function of setting the last designated day to be the end day without provoking an error condition even if the operation was finished after designating coordinates other than the date or the scroll command.

When a schedule exists in a certain period of time in a conventional schedule management apparatus, it was possible to confirm the schedule on a calendar because the contents and the graph of the schedule were displayed. However, when the schedule was confirmed on a screen for a day or for a week, it was not possible to look at the set term or the plan of a term schedule overlapping with the displayed day or week, so that the screen had to be switched to a calendar.

Also, if the set term for the term schedule is to be inputted by designating coordinates (dates) with a pen on a displayed calendar, it was difficult to confirm with eyes what day the setting of the schedule started from, provoking a fear of misinput.

Moreover, if one wished to set a long term which is lying across months as a term for a schedule, there was provided no means for inputting in coordinates (designation of dates with a pen), necessitating a manual input of the end day of the term to be set, which involved a cumbersome work.

Also, when a plan existed on a prescribed day of the week or days of the week during a predetermined period of time, there was provided no means for inputting the term at a time, so that it was necessary to input the term, for example, day by day.

Also, an error condition was provoked if coordinates other than a date or a scroll command were designated by a mistake to finish the operation in setting the term schedule by coordinates on a calendar. In such a case, it was necessary to set the term again, which involved a cumbersome work.

SUMMARY OF THE INVENTION

The present invention has been made in view of these circumstances and the purpose thereof is to provide a schedule management apparatus that enables one to look at the set term or the plan of the term schedule on a day or in a week even if the schedule is confirmed on a screen for the day or for the week.

The present invention provides a schedule management apparatus comprising: term data input means for inputting a term data by designating a start day and an end day; schedule input means for inputting a schedule corresponding to the term data inputted by the term data input means; storage means for storing the term data and the schedule in correspondence; date designation means for designating a specific date; retrieval means for retrieving, from the storage means, the term data including the specific date designated by the date designation means; and schedule display means for displaying at least the start day and the end day of the term data retrieved by the retrieval means.

According to the present invention, when a specific day is designated and the date is included in a term schedule which has already been set, the start day and the end day of the term schedule are displayed, thus facilitating the confirmation of schedule.

BRIEF DESCRIPTION OF THE DRAWINGS

FIG. 14 is an explanatory view showing a display state in the embodiment.

FIG. 15 is an explanatory view showing a display state in the embodiment.

DESCRIPTION OF THE PREFERRED EMBODIMENTS

Figure 1:
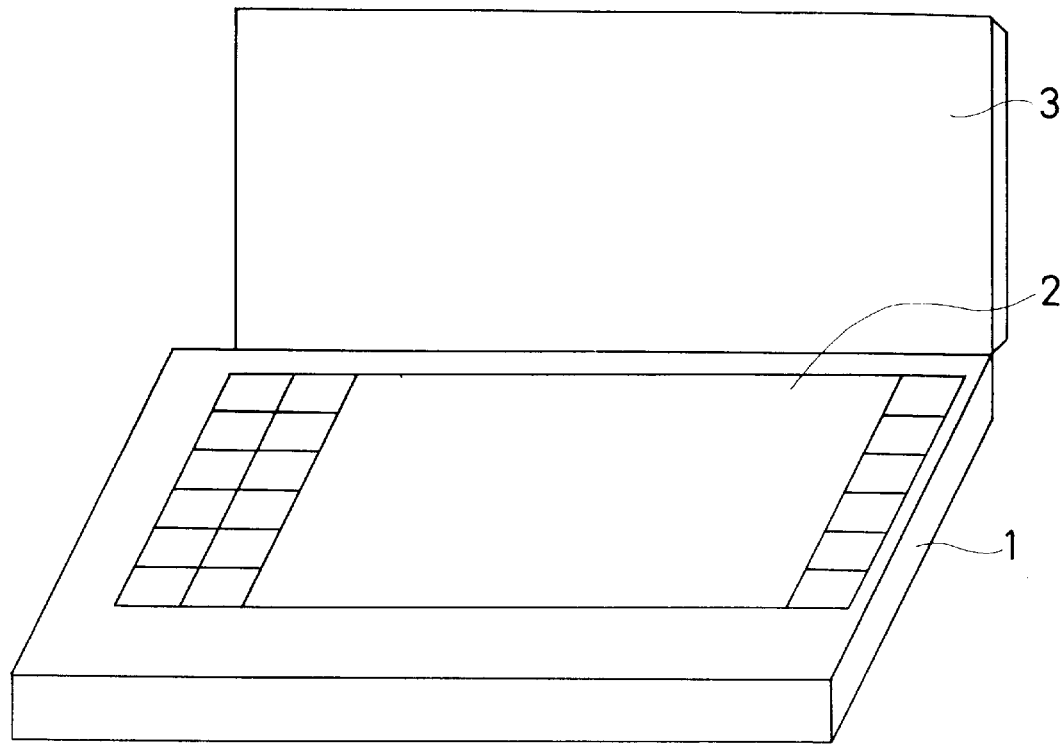
FIG. 1 is an explanatory view for showing an outlook of an embodiment in which the present invention is applied to a small schedule management apparatus.

In the present invention, each of the term data input means, the schedule input means, and the date designation means typically comprises a keyboard or a pointing device such as a pen, a mouse, or a track ball.

The retrieval means preferably comprises a microprocessor including a CPU, a ROM, a RAM, and the like. The storage means typically comprises a RAM.

The schedule display means may comprise a displaying device such as a CRT display device, a liquid crystal display device, an EL display device, a plasma display device, or the like.

Preferably, the schedule display means further displays the contents of the schedule corresponding to the term data retrieved by the retrieval means.

According to the above construction, when a specific day is designated and the date is included in a term schedule which has already been set, the start day and the end day of the term schedule are displayed and, further, the contents of the schedule corresponding to the start day and the end day are displayed.

Preferably, the schedule management apparatus according to the present invention further comprises a week designation means for designating a specific week, wherein the retrieval means further performs a function of retrieving, from the storage means, the term data included in the specific week designated by the week designation means, and wherein the schedule display means further performs a function of displaying, in figure, the interval between the start day and the end day of the term data retrieved by the retrieval means and a function of further displaying the contents of the schedule during the interval.

According to the above construction, when a specific week is designated and some or all days of the week are included in a term schedule which has already been set, the interval between the start day and the end day of the term schedule is displayed in figure and, further, the contents of the schedule during the interval are displayed.

Preferably, the schedule management apparatus according to the present invention further comprises a calendar display means for displaying a calendar and a scroll means for scrolling the displayed calendar, wherein the term data input means further performs a function of inputting a term between a start day and an end day as continuous term data even if the scrolling means performs scrolling during a period between designation of the start day and designation of the end day.

According to the above construction, even if scrolling is performed during a period between designation of the start day and designation of the end day, the term between the start day and the end day can be inputted as continuous term data.

Preferably, the schedule management apparatus according to the present invention further comprises a day of the week designation means for designating a specific day of the week, wherein the schedule input means further performs a function of inputting only the schedule corresponding to the specific day of the week within the term data inputted by the term data input means.

According to the above construction, when a schedule exists on specific day(s) of the week during a predetermined term, it is possible to set the schedule for the specific day(s) of the week during the predetermined term by inputting the term and the day(s) of the week.

Embodiments of the present invention will now be described, by way of example, with reference to the accompanying drawings. The embodiments given herein are not to be construed as being intended to limit the scope of the present invention.

FIG. 1 is an explanatory view for showing an outlook of an embodiment in which the present invention is applied to a small schedule management apparatus.

Referring to FIG. 1, the small schedule management apparatus of the present invention is constructed mainly with a body cabinet 1 and a lid 3.

The body cabinet 1 incorporates an input and output section 2, a control circuit for performing an overall control of the apparatus, a power supply section for supplying an electric power to necessary portions, and the like. The lid 3 is connected to the rear surface of the body cabinet 1 and covers the input and output section 2 so as to protect the input and output section 2 when the apparatus is carried by hand.

Figure 2:
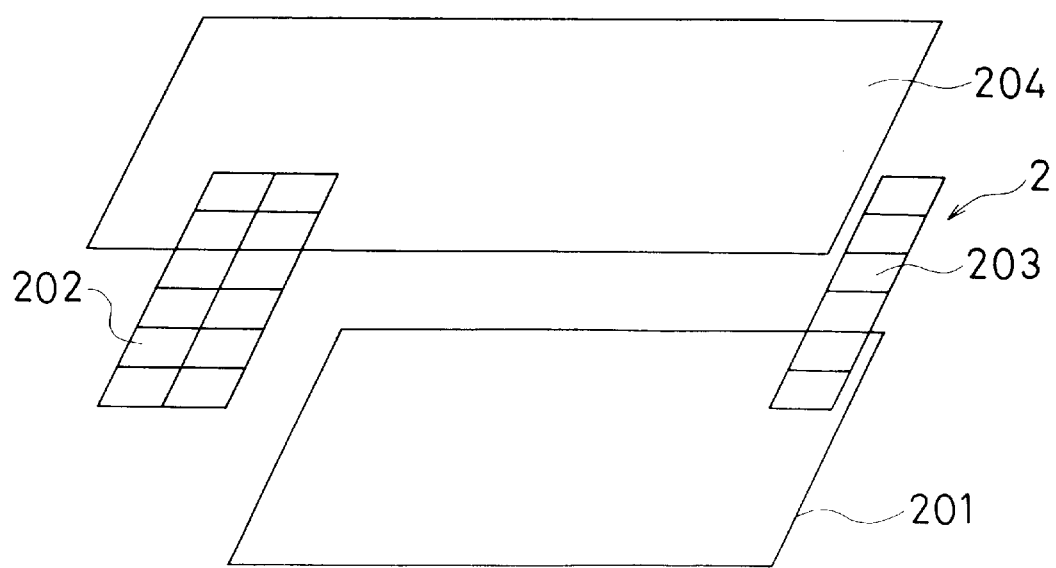
FIG. 2 is an explanatory view for showing an input and output section of the embodiment in an exploded state.

FIG. 2 is an explanatory view for showing the input and output section 2 in an exploded state.

Referring to FIG. 2, the input and output section 2 includes a liquid crystal display section 201, mode selection keys 202, function selection keys 203, and a transparent tablet 204 for inputting coordinates. The input and output section 2 also includes numeral-character inputting keys (not shown) as data input means.

The liquid crystal display section 201 may be of a thin matrix type capable of displaying characters. The liquid crystal display section 201 may be a color display and have a backlight in its rear surface. The transparent tablet 204 may be constructed in such a manner that two transparent sheets each having a transparent electrode on the inside thereof are disposed to face each other via small projecting spacers so that the two electrodes on the sheets do not contact with each other at ordinary states.

The transparent tablet 204 may have a size sufficient to entirely cover the liquid crystal display section 201, the mode selection keys 202 disposed thereabove, and the function selection keys 203 disposed thereunder.

The mode selection keys 202 help the user to select any one of the modes including the schedule mode for management of schedules, the address notebook mode for management of telephone numbers, the calculator mode for calculation with an electronic calculator, and a world clock mode for confirming a time at various places in the world.

The function selection keys 203 help the user to select a functional operation such as a clearing function or a cursor controlling function which is commonly used in each mode selected with the mode selection keys.

The mode selection keys 202 and the function selection keys 203 are prepared by printing the names (referred to as symbols) of the various modes and various functions on one of the sheets and cooperate with the transparent tablet 204 to serve as switches.

Namely, when the user indicates, with a pen, one of the symbols printed on the sheet as mode selection keys 202 and function selection keys 203, the position of the symbol is detected by contact of the transparent electrodes of the transparent tablet 204.

Figure 3:
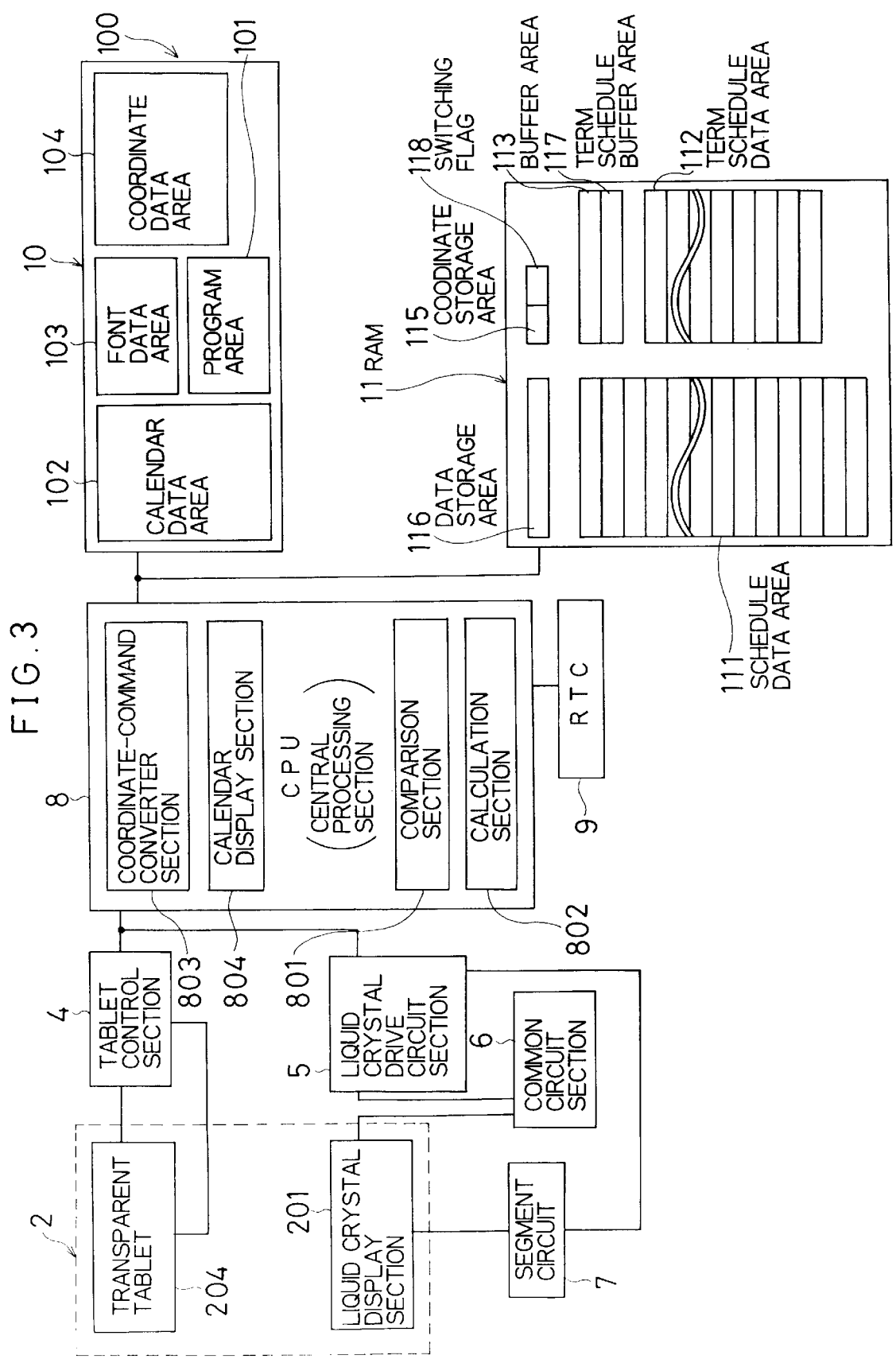
FIG. 3 is an explanatory view for schematically showing an overall construction of a control circuit of the embodiment.

FIG. 3 is an explanatory view for schematically showing an overall construction of a control circuit of this schedule management apparatus.

Referring to FIG. 3, the control circuit 100 includes an input and output section 2, a tablet control section 4, a liquid crystal drive circuit section 5, a common circuit 6, a segment circuit 7, a CPU (central processing unit) 8, a RTC (clock section) 9, a ROM 10 as a memory, and a RAM 11.

The tablet control section 4 serves for taking coordinate data out from the transparent tablet 204. The tablet control section 4 is connected to the transparent electrode disposed on one transparent sheet of the transparent tablet 204 and to the transparent electrode disposed on the other transparent sheet. The position of the symbol indicated with the pen is detected by the contact of the two transparent electrodes.

The liquid crystal drive circuit section 5 stores, as a bit map, the dot positions for lighting the liquid crystal and, in accordance with the needs, sends signals to the common circuit 6 and the segment circuit 7. The common circuit 6 and the segment circuit 7 allow the liquid crystal display section 201 to display an output image on receiving the signals from the liquid crystal drive circuit section 5.

The CPU 8 performs an overall control of the apparatus. The CPU 8 includes a comparison section 801 for comparing the dates and the like, a calculation section 802 for performing an operation such as calculation of dates from a specific day, a coordinate-command converter section 803 for converting the coordinates stored in the coordinate storage area 115 to commands, a calendar display section 804 for preparing calendar display data to be displayed on a calendar and for sending the data to the liquid crystal drive circuit section 5 on receiving the commands. The CPU controls the input data and the output data on receiving various commands.

The RTC 9 calculates and outputs the present time based on the clock signal.

The ROM 10 includes a program area 101 that stores a control program for operating the CPU 8, a calendar data area 102 for storing the data such as dates of each month needed for preparing a calendar, a font data area 103 for storing the fonts of the characters to be displayed by the liquid crystal display section 201. The ROM 10 further includes a coordinate data area 104 for storing, as coordinates, the position of the contents displayed by the liquid crystal display section 201 and the position of the various keys of the mode selection keys 202 and the function selection keys 203.

The contents stored in the coordinate data area 104 are used in determining, for example, what key the coordinates detected by the tablet control section 4 corresponds to.

The RAM 11 includes a schedule data area 111 for storing the date (year-month-day), the time, and the plan inputted by the user through the input and output section 2 as schedule data; a term schedule data area 112 for storing the kind, the start day, the end day, and the plan of the term schedule; a buffer area 113 for temporarily holding the schedule data; a term schedule buffer area 117 for temporarily holding the term schedule data; a switching flag 118 that stores a flag for switching the input setting of the coordinates between an ordinary input state and an input state using day of the week designation; a coordinate storage area 115 for storing the inputted X-Y coordinates; and a date storage area 116 for holding the date (year-month-day).

The buffer area 113 holds, for example, the contents of a plan specified by the CPU 8 based on the coordinates that are read when the user indicates a position on a transparent tablet 204 with a pen on a calendar displayed by the liquid crystal display section 201.

The term schedule buffer area 117 holds, for example, the data extracted from the term schedule data area 112. The date storage area 116 holds the date (year-month-day) calculated using the coordinates that are read when the user indicates a position on a transparent tablet 204 with a pen on a calendar displayed by the liquid crystal display section 201.

Here, if the pen is moved to another date while the input is continuously carried out on the transparent tablet 204, the contents in the buffer area 113 are not changed, whereas the contents in the date storage area 116 are changed in real time in accordance with the movement of the pen to another date.

Figure 4:
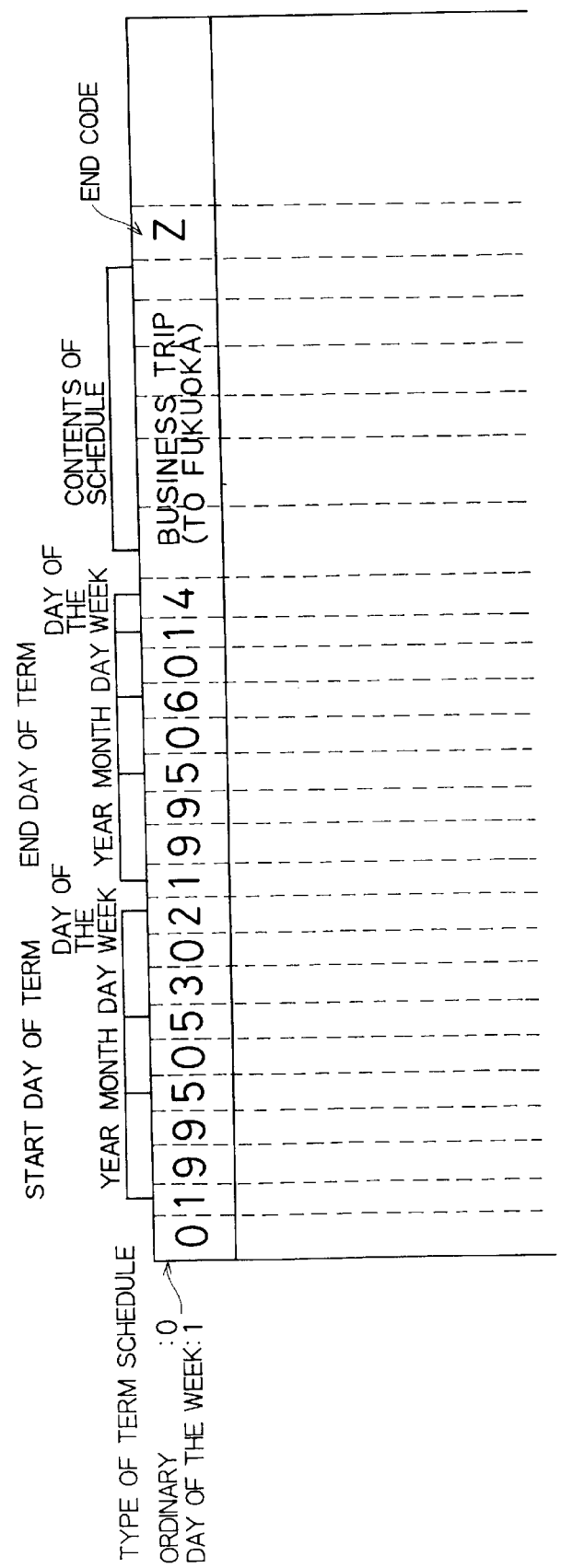
FIG. 4 is an explanatory view for showing an example of the state of stored data in a term schedule data area of the embodiment.

FIG. 4 is an explanatory view for showing an example of the state of stored data in the term schedule data area 112. This example shows a specific format in which the contents of the term schedule are stored in the term schedule data area 112 with one block corresponding to one data.

Referring to FIG. 4, at the head portion of one block in the term schedule data area 112 is stored a code showing whether the data is an ordinary term schedule or a day of the week term schedule for specific day(s) of the week. Subsequently, the date (year-month-day) and the day of the week of the start day of the term to be set together with the date (year-month-day) and the day of the week of the end day of the term to be set are stored. The contents of the schedule are then stored. Various coding methods may be employed in storing the data. For easy reference, however, characters such as Japanese Kanji are shown as they are written and without being coded in FIG. 4.

The operation of the apparatus in the example constructed as above will hereafter be explained.

(1) First, an explanation will be given on the process of displaying the term when a schedule is displayed. Suppose that a schedule for a day or for a plurality of days is set as a term schedule. If a schedule for a day is displayed sometime afterwards and the day is included within the term set as the term schedule, then the start day and the end day of the term schedule are displayed in addition to the contents of the schedule for the day. The operations of the above process will hereafter be explained referring to the flowcharts shown in FIG. 5 and FIG. 6.

In the following explanation, the present date indicated by RTC 9 will be "May 29, 1995 (Monday)"; the term for the term schedule will be "May 30 to June 1"; the contents of the plan will be "business trip (to Fukuoka)". These data are assumed to be already stored in the term schedule data area 112.

Step S101

When the user selects the "schedule" in the mode selection keys 202, the tablet 204 detects it and the apparatus goes into the schedule mode. When the apparatus goes into the schedule mode, the present date of May 29, 1995 (Monday) will be extracted from RTC 9, and the calendar display data will be sent to the liquid crystal drive circuit section 5 by the calendar display section 804 on the basis of the data in the calendar data area 102 of the ROM 10.

Step S102

Then, the CPU examines whether there is a data in the term schedule data area 112. If a data exists in the term schedule data area 112, the procedure will go to step S103. If a data does not exist, the procedure will go to step S10A. In the above case, the procedure goes to step S103 because there is a data in the term schedule data area 112.

Step S10A

If there is no relevant data, a calendar of one month including the date extracted from RTC 9, for example, will be displayed on the liquid crystal display section 201. In this instance, the calendar of May will be displayed.

Step S103

The CPU then examines whether the term schedule data area 112 stores a schedule data of the present month (May 1995) by comparing the present month extracted from RTC 9 with the month of each data stored in the term schedule data area 112. This examination can be carried out by chronological comparison with the start month, the end month, and the present month. In this instance, the term schedule "May 30 to Jun. 1, 1995", "business trip to Fukuoka" is found relevant.

Step S104

The year-month-day of the term schedule data found relevant in the step S103 will be stored in the term schedule buffer area 117.

Step S105

The CPU then judges whether all the data stored in the term schedule data area are compared in the step S103. This judgement is carried out by a conventional method such as storing the number of data to make comparisons for that number of times. The explanation of this method will be omitted here.

Step S106

Figure 10:
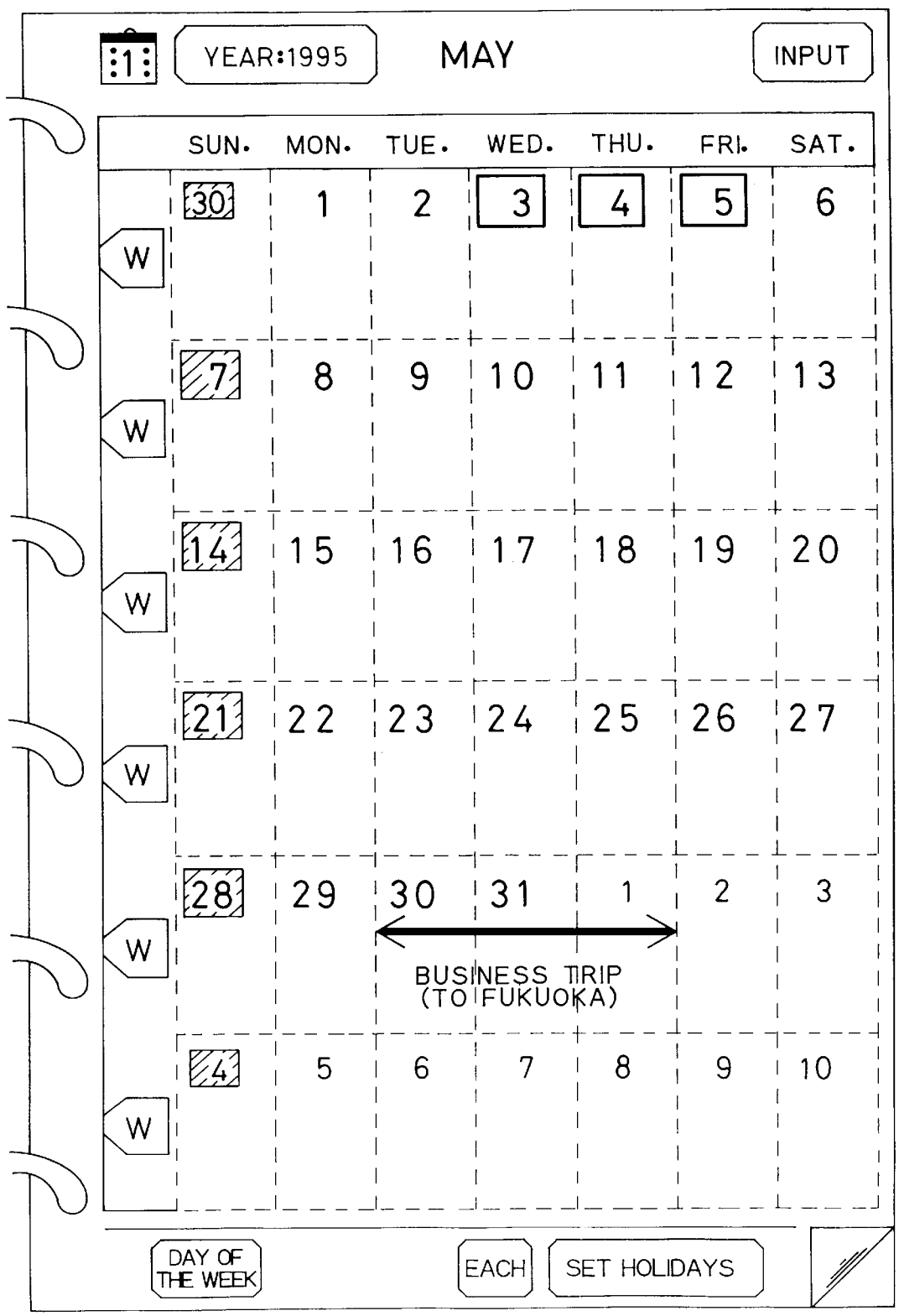
FIG. 10 is an explanatory view showing a display state in the embodiment.

After all the data stored in the term schedule data area 112 are compared in the step S103, the liquid crystal display section 201 displays a calendar of the present month (May in this instance) together with the detected term schedules, as shown in FIG. 10.

Step S107

If, for example, a portion displaying the date of May 30 on the transparent tablet 204 is indicated with a pen, the X-Y coordinates of its position will be detected by the tablet control section 4, and its coordinates will be sent to the coordinate storage area 115.

Step S108

Then, by making a reference to the data in the coordinate data area 104, the CPU judges whether the coordinates sent to the coordinate storage area 115 are on the calendar or not. If the coordinates are outside of the calendar, a different process which is represented by the coordinates will be carried out.

Steps S109 to S110

Subsequently, the calendar date corresponding to the coordinates indicated on the tablet 204 in the step S107 will be specified. In this instance, the CPU judges that the coordinates correspond to the date of May 30, 1995, and stores the date in the date storage area 116.

Step S111

Then, the CPU judges whether a plan is stored corresponding to the day (May 30, 1995) designated by the coordinates. Namely, the date of the data stored in the term schedule data area 112 and the date of "May 30, 1995" stored in the date storage area 116 are compared in the comparison section 801.

Step S112

Since the term schedule data area 112 stores the term schedule that there will be a business trip from May 30 to Jun. 1, 1995, the CPU judges that there is a relevant data as a result of the comparison, whereupon the data stored in the term schedule data area 112 will be retained in the term schedule buffer area 117.

Step S10B

If no relevant data is found in the step S111, the displayed screen will be changed to a screen for input of the contents of a plan on May 30 without displaying the term schedule.

Step S113

Figure 11:
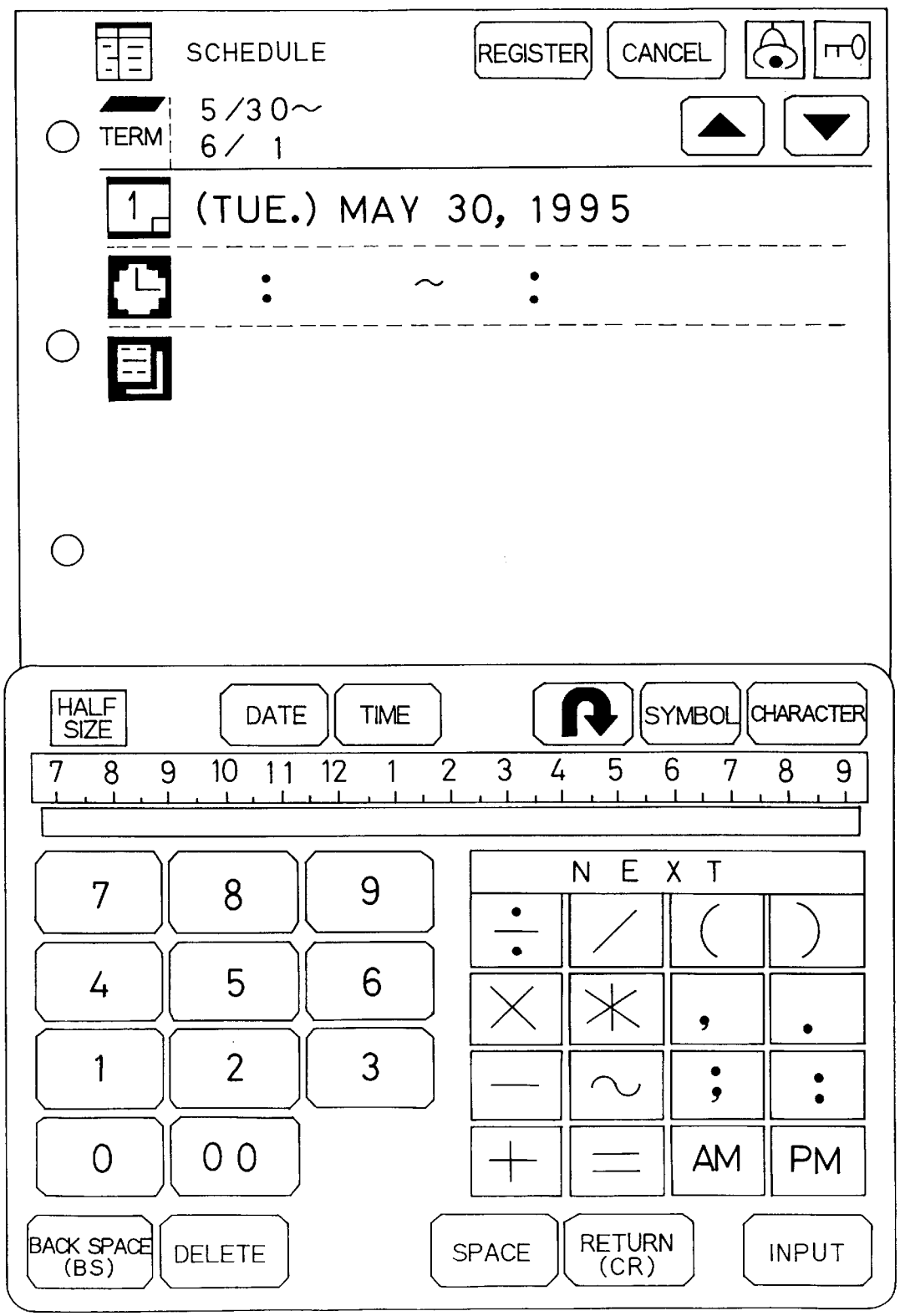
FIG. 11 is an explanatory view showing a display state in the embodiment.

The CPU 8 judges whether there is a data in the term schedule buffer area 117 in proceeding to the screen for input of the contents of a plan on May 30 by an instruction from the coordinate-command converter section 803. If a data is found, the CPU 8 displays the set term by recalling the start day and the end day of the term schedule from the RAM 11, as shown in FIG. 11. The set term will be displayed on the screen displaying the schedule also after the contents of the plan has been inputted.

In the above process, the contents of the term schedule may also be displayed in addition to the start day and the end day of the term schedule.

(2) Next, an explanation will be given on the process of displaying the term and the contents of the schedule when the schedule is displayed. When schedules for a certain day are displayed and if the day is included within a term previously set in a term schedule, this process involves displaying the contents of the term schedule as well as displaying the start day and the end day of the term schedule. The process will be explained with reference to the same flowchart as above.

In the following explanation, the present date indicated by RTC 9 will be "May 29, 1995 (Monday)"; the term for the term schedule will be "May 30 to June 1"; the contents of the plan will be "business trip (to Fukuoka)", as previously described. These data are assumed to be already stored in the term schedule data area 112.

Steps S101 to S111

In this process, the same operations as above will be carried out from the step S101 up to S110. In the step S111, the date of the data stored in the term schedule data area 112 and the date of "May 30, 1995" stored in the date storage area 116 will be compared in the comparison section 801.

Step S112

Since the date of "May 30, 1995" is found to be included in the term schedule data for May 30 stored in the term schedule data area 112 as a result of the comparison in the step S111, the start day and the end day of the term schedule and the contents of the schedule will be retained in the term schedule buffer area 117.

Step S113

Figure 12:
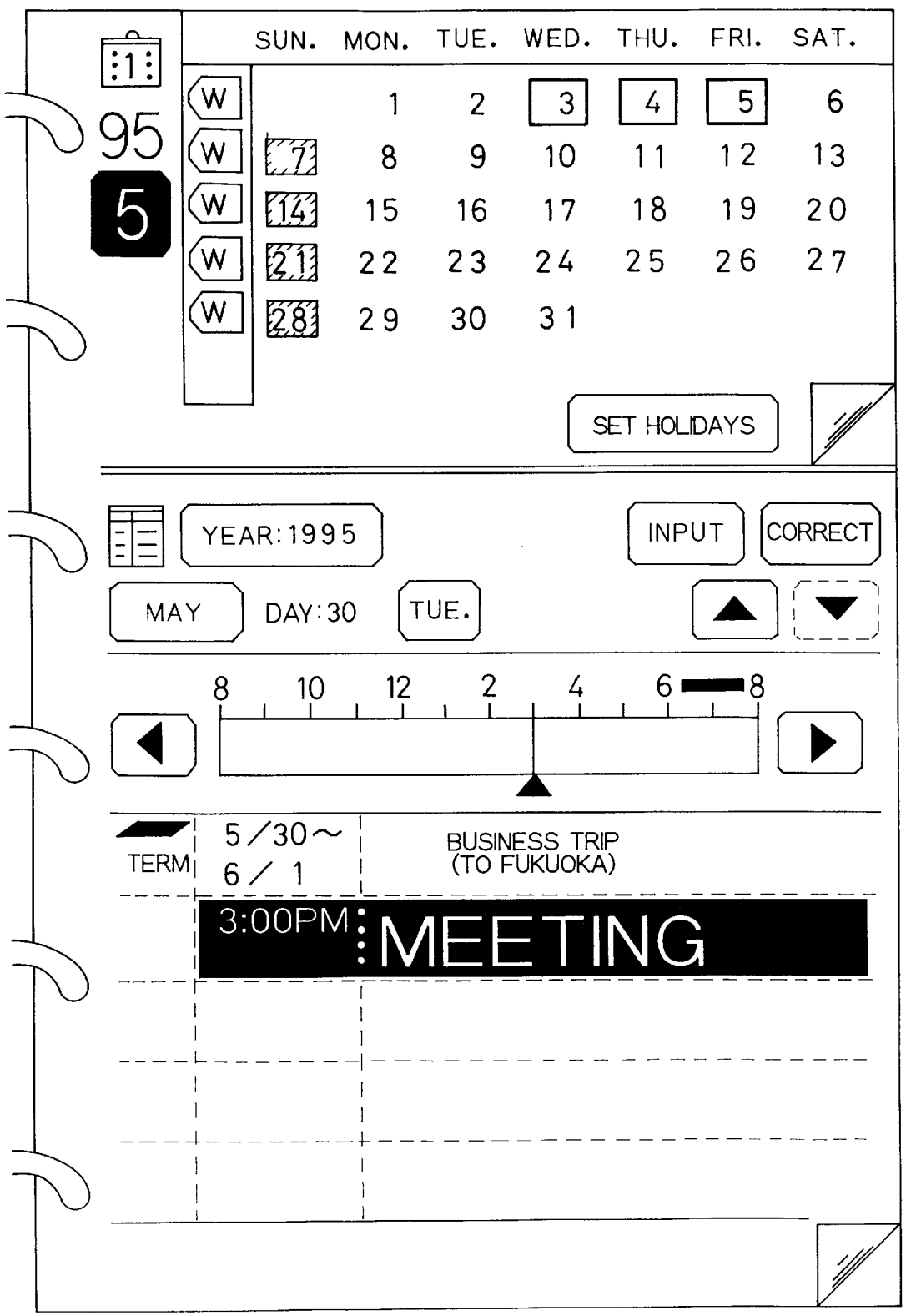
FIG. 12 is an explanatory view showing a display state in the embodiment.

The liquid crystal display section 201 switches from the screen for displaying a one-month calendar for May to a screen for inputting a plan for the day of May 30. When the switching of the screen is carried out, the CPU 8 judges whether there is a data in the term schedule buffer area 117. If a data is found, the set term of the term schedule (the start day and the end day) and the contents of the plan will be displayed, as shown in FIG. 12.

(3) Next, an explanation will be given on a process of displaying the planned term and contents when a week schedule is displayed on the screen. When a schedule for one week is displayed and if one or more days of the week are included within a term previously set in the term schedule, this process involves displaying the set term of the term schedule (the start day and the end day) and the contents of the schedule in addition to the schedule for the week. The process will be explained with reference to the same flowchart as above.

In the following explanation, the present date indicated by RTC 9 will be "May 29, 1995 (Monday)"; the term for the term schedule will be "May 30 to June 1"; the contents of the plan will be "business trip (to Fukuoka)", as previously described. These data are assumed to be already stored in the term schedule data area 112.

Steps S101 to S106

The procedure goes through steps S101 to S106 to display a calendar of May.

Steps S107 to S108

When a key for a weekly schedule display including May 30, 1995 is indicated with a pen on the transparent tablet 204, the X-Y coordinates on the tablet will be detected and sent to the coordinate storage area 115. The key for a weekly display is located, for example, on the left side adjacent to the leftmost day of the week on the transparent tablet 204 (the position shown by "W" in the figure).

Step S301

The CPU judges, on the basis of the data stored in the coordinate data area 104, that the coordinates sent to the coordinate storage area 115 are directed to a command for switching to a screen displaying the week including May 30, 1995.

Step S302

Based on the day designated in the step S107, the beginning day and the ending day of the week (the starting day being Sunday, May 28 and the ending day being Saturday, June 3 in this instance) will be calculated by the calculation section 802 and stored in the date storage area 116.

The user can arbitrarily decide what day of the week will be beginning day in displaying the schedule of the week. The calculation section 802 calculates the beginning day of the week based on the above decision of the user. In this instance, the beginning day is set at Sunday.

Step S111

In this step, the date data in the term schedule data area 112 and the seven days from May 28 to Jun. 3, 1995 stored in the date storage area 116 are compared by the comparison section 801 so as to find out whether the designated week contains a term schedule.

Step S112

Since the term schedule data of May 30 stored in the term schedule data area 112 is found to be relevant by the comparison in the step S111, the term and the plan of the term schedule will be retained in the term schedule buffer area 117.

Step S113

Then, the calendar display section 804 executes the command received through the coordinate input for switching to the weekly display in the step S301, and the liquid crystal display section 201 switches the screen from the one-month calendar display of May to the weekly display of the seven days beginning on May 28 and including May 30.

Figure 13:
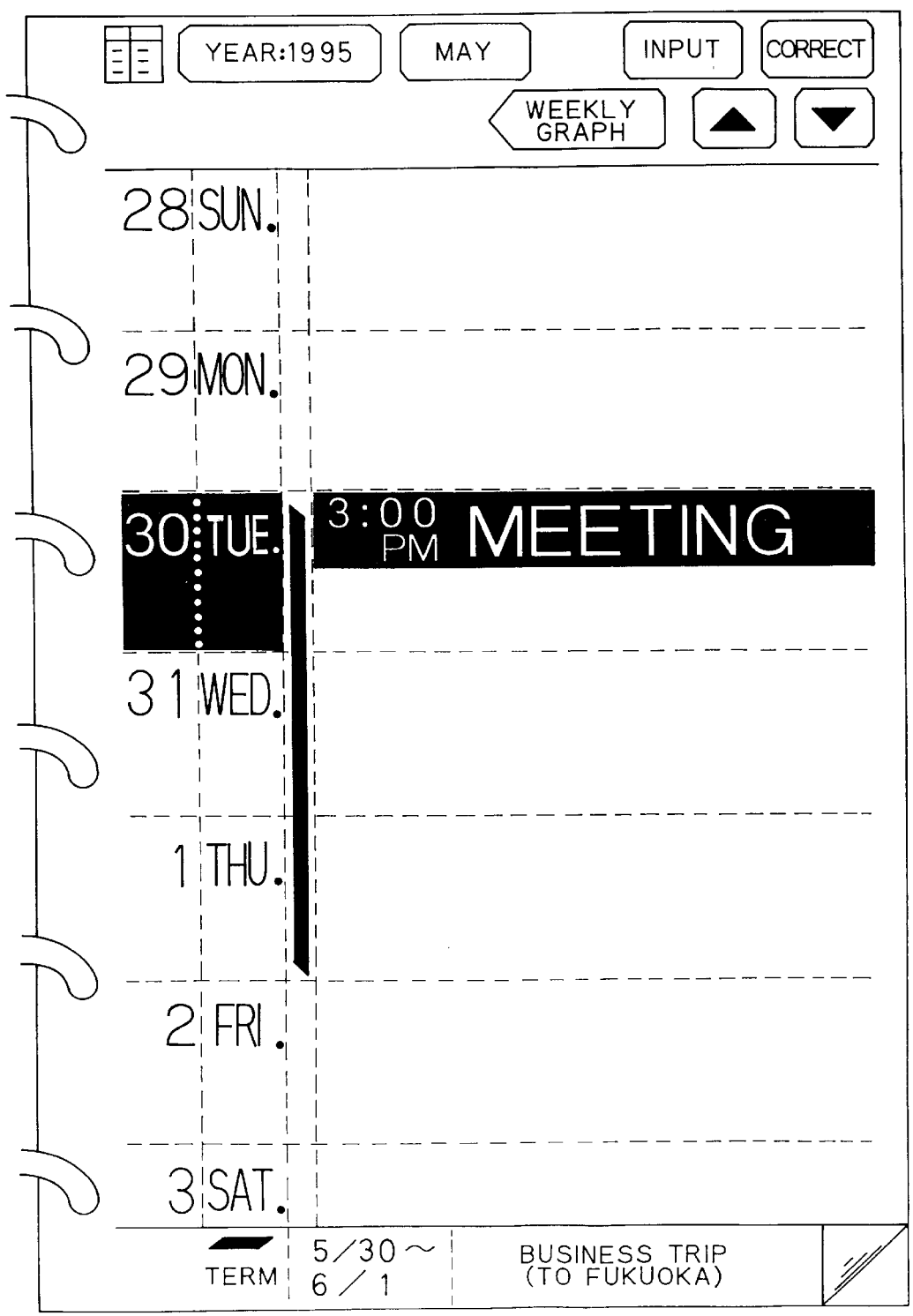
FIG. 13 is an explanatory view showing a display state in the embodiment.

The CPU 8, in switching the screen, judges whether there is a data in the term schedule buffer area 117 and, if a data is found, the set term of the term schedule will be displayed in bars together with the contents of the plan, as shown in FIG. 13.

When the weekly schedule is displayed, the CPU performs in the Step 111 a comparison not only with term schedules but also with ordinary data for each day in the schedule data area 111, and displays the relevant data.

(4) Next, an explanation will be given on a term setting process when a calendar is displayed on the screen. This process involves, for example, displaying a term in reverse video by designation with a pen on the calendar displayed on the screen, thereby setting the term for a term schedule.

Namely, this process is to display in reverse video the dates designated by input of continuous coordinates when the term for a term schedule is to be set via the transparent tablet 204 with the calendar displayed on the screen. The operation of the process will hereafter be described by referring to the flowchart shown in FIGS. 7a and 7b. In this instance, the explanation will be given on an exemplifying case where the term from May 30 to Jun. 1, 1995 will be set.

Step S402

Figure 5:
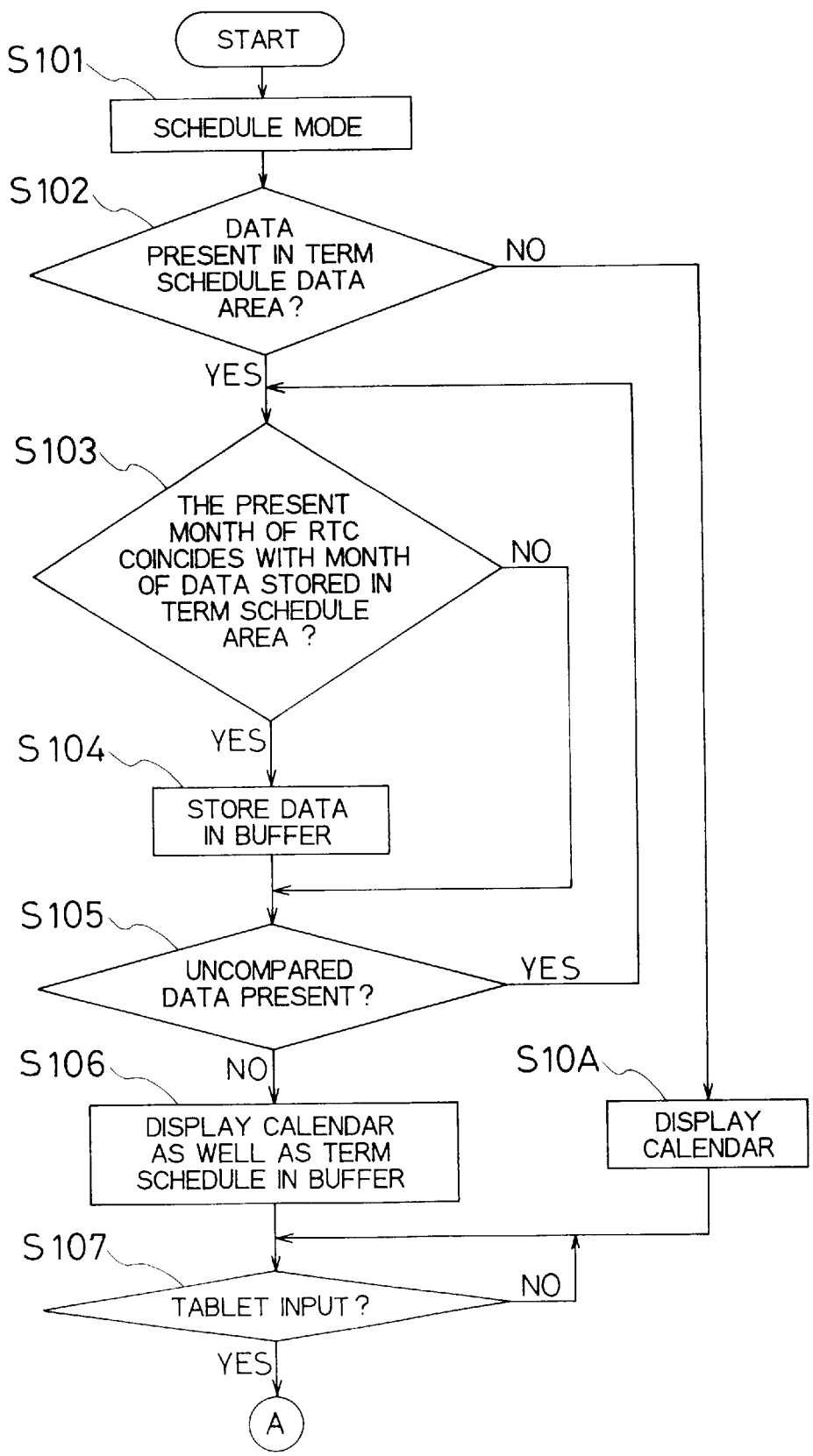
FIG. 5 is a flowchart showing a process for displaying a planned term when a schedule is displayed in the embodiment.
Figure 6:
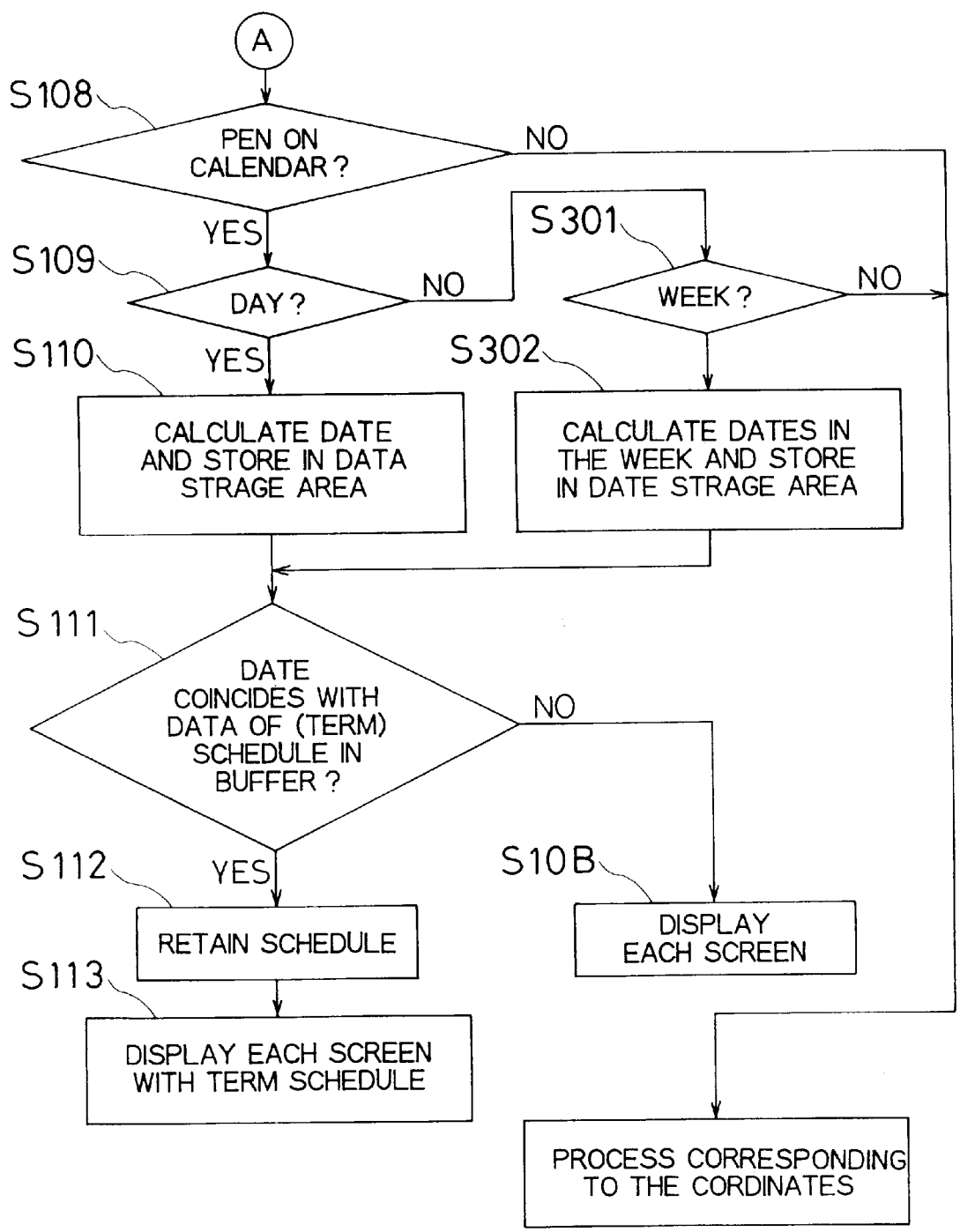
FIG. 6 is a flowchart showing a process for displaying a planned term when a schedule is displayed in the embodiment.

When a position of the transparent tablet 204 displaying May 30 is indicated with a pen with the calendar of May displayed on the screen via the steps S101 to S10A in the flowchart of FIG. 5 as shown in FIG. 14, the X-Y coordinates of the position are detected by the tablet control section 4 and sent to the coordinate storage area 115.

Steps S403 to S404

Based on the data in the coordinate data area 104, the CPU judges that the coordinates sent to the coordinate storage area 115 correspond to May 30, 1995 on the calendar and stores the date in the date storage area 116. The date is also stored in the term schedule buffer 117 as a starting day of the term to be set.

Step S405

On receiving an instruction from the coordinate-command converter section 803, the CPU 8 displays the date of May 30, 1995 in reverse video on the liquid crystal display section 201.

Step S406

The CPU then judges whether the pen has moved to coordinates other than those of the date stored in the date storage area 116 in the step S404.

Step S410

If the pen has not moved to coordinates other than those of the date stored in the date storage area 116, the CPU judges whether the pen has been released from the transparent tablet 204 because the release of the pen from the tablet 204 must be regarded as an end of the input.

Step S407

When the pen is confirmed to have been moved, the CPU reads the coordinates of the destination of the pen to judge whether the destination of the pen is on a date in a calendar. If, for example, the pen has been moved to the coordinates of June 1, the CPU judges that the coordinates are on a date in a calendar and changes the data stored in the date storage area 116. The case where the destination of the pen is not on a date will be explained later.

Step S408

Then, the calculation section 802 of the CPU 8 calculates the dates included between the start day of May 30, 1995 stored in the term schedule buffer 117 in the step S404 and the date of Jun. 1, 1995 which is stored in the date storage area 116 and renewed in the step S407. The calculated dates are then stored in the term schedule buffer 117.

Step S409

The coordinate-command converter section 803 of the CPU 8 converts the date data stored in the term schedule buffer 117 into coordinate data and displays the screen region of the dates of May 30 to Jun. 1, 1995 in reverse video by means of the liquid crystal display section 201. The steps from S407 to S409 will be repeated while the pen is being moved to a different date.

Step S410

Figure 15:
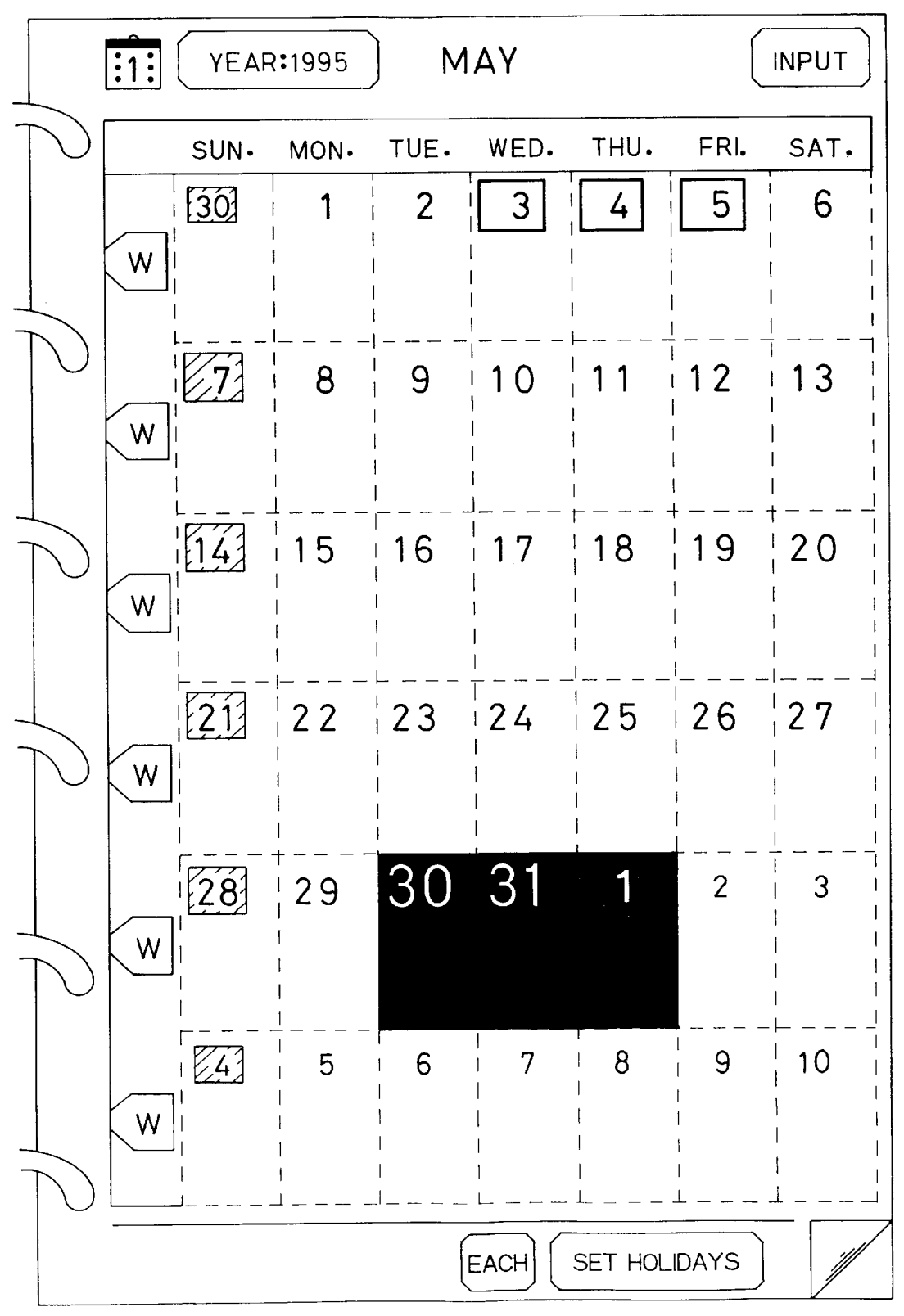

When the pen has been released from the coordinates of June 1, the tablet input will be finished, whereby the display in reverse video and the setting of the term will be ended, as shown in FIG. 15.

This calculation makes it possible to set the term by merely indicating the coordinates of the end day, thereby eliminating the need of indicating the coordinates of all the dates within the term.

Figure 16:
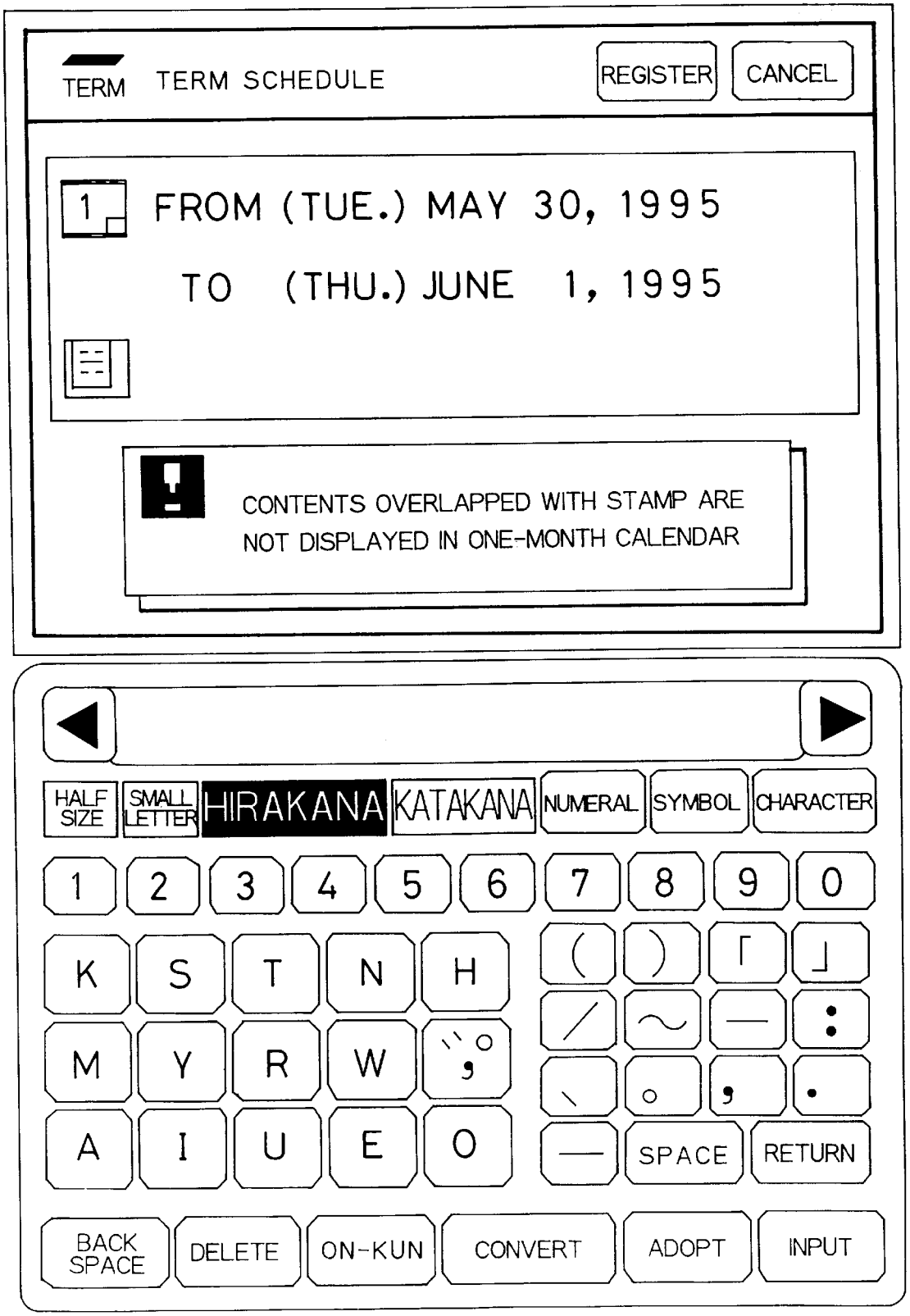
FIG. 16 is an explanatory view showing a display state in the embodiment.

Thus, the start day and the end day of the term schedule will be automatically set and the display will be switched to the screen for inputting the contents of the term schedule, as shown in FIG. 16.

Another alternative method of setting a term for a term schedule may involve use of input keys for inputting characters and numerals in the input and output section 2 using a screen with no inputted dates shown in FIG. 16 instead of the designation of coordinates on a displayed calendar.

(5) Next, an explanation will be given on a process for setting a long term on a displayed calendar. This process involves setting a long term at a time by scrolling the displayed calendars back and forth without releasing the pen when the term schedule is to be set by inputting continuous coordinates by the above method of the steps S401 to S409. The operations of the process will hereafter be explained by means of the same flowchart as above. In this instance, the explanation will be given on an exemplifying case where the long term of "an overseas business trip from May 30, 1995 to Aug. 31, 1995" will be inputted.

Step S501

The procedure goes through the steps S402 to S407, wherein the CPU judges that the coordinates sent to the coordinate storage area 115 correspond to the position of May 30, 1995 on the basis of the data stored in the coordinate data area 104, whereupon the region of May 30 will be displayed in reverse video. Subsequently, when the coordinates of "forward scroll" for scrolling the calendar to that of the next month are indicated with a pen, the CPU confirms in the step S407 that the coordinates are not on a position for a date and judges whether the coordinates are on a position for a scrolling command.

Step S502

After judging that the pen indicates the coordinates for a command of scrolling the calendar on the screen, the CPU judges whether the coordinates are for forward scrolling (displaying the next month) or for backward scrolling (displaying the previous month).

Step S503

If the CPU judges that the coordinates are for forward scrolling of the displayed calendar in the step S502, the CPU 8 converts the coordinate data into a command for scrolling the displayed calendar to the next month by means of the coordinate-command converter section 803, whereby the calendar display section 804 displays the calendar of June by means of the liquid crystal display section 201 while retaining the term setting from May 30 on the displayed calendar of May.

Subsequently, the procedure goes back to the step S406 and repeats the steps of S407 and S501 to S503 to switch the screen from the calendar of June to the calendar of July and from the calendar of July to the calendar of August.

Step S407

The procedure then goes back to the step S406 and, when the pen is brought on the coordinates of August 31, the CPU judges that they are indeed coordinates of a date, whereby the CPU renews the data of the date storage area 116 to August 31, and proceeds to the step S408.

Step S408

Then, the calculation section 802 of the CPU 8 calculates the dates included between the start day of May 30, 1995 stored in the term schedule buffer 117 in the step S404 and the date of Aug. 31, 1995 which is stored in the date storage area 116 and renewed in the step S407. The calculated dates are then stored in the term schedule buffer 117.

Step S409

The coordinate-command converter section 803 of the CPU 8 converts the date data stored in the term schedule buffer 117 into coordinate data and displays the screen region of the dates in reverse video by means of the liquid crystal display section 201.

Step S410

When the pen has been released from the coordinates of August 31, the tablet input will be finished, whereby the display in reverse video and the setting of the term will be ended.

Figure 8A:
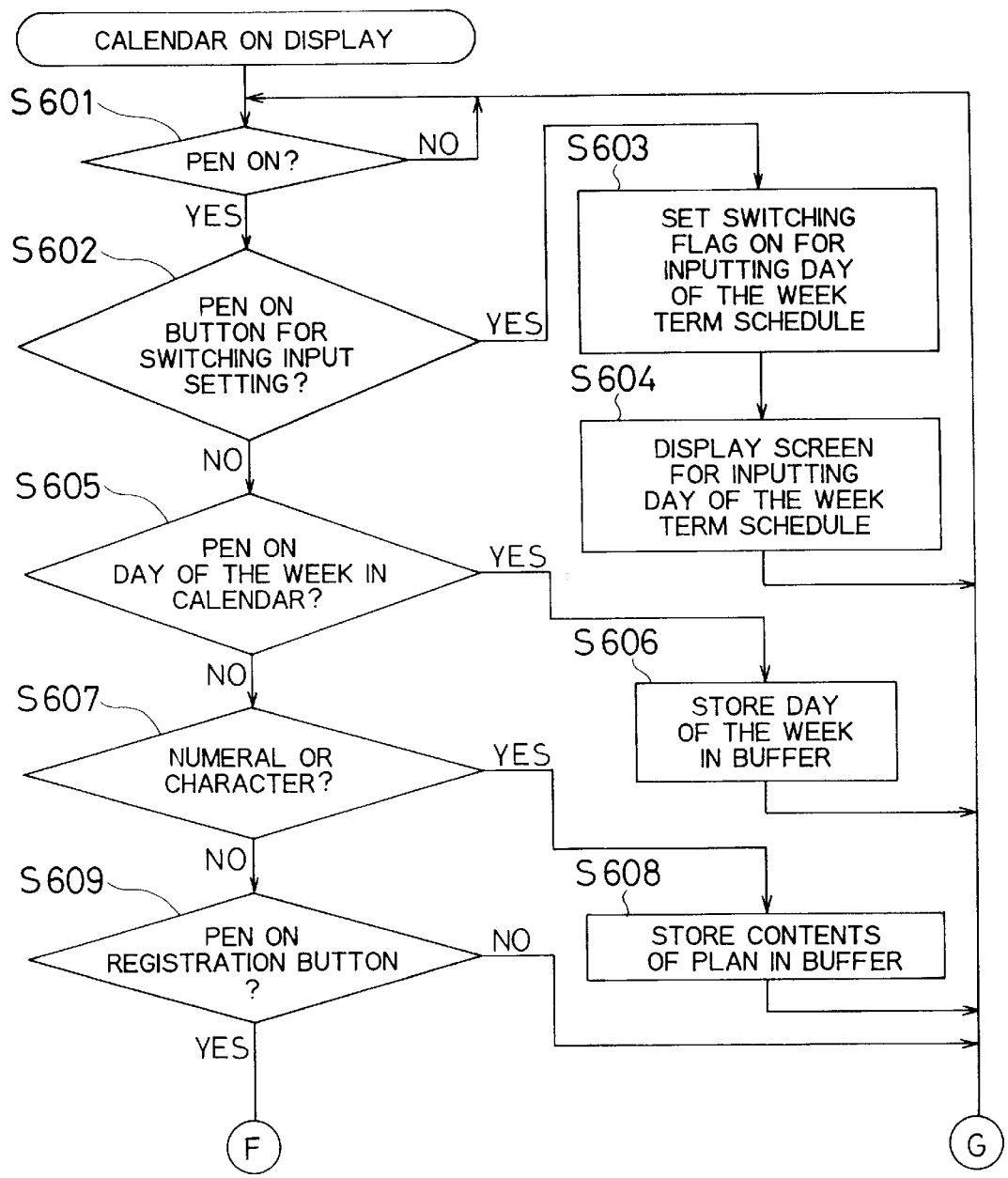
FIGS. 8a and 8b are a flowchart showing a process for setting a term for days of the week in the embodiment.
Figure 8B:
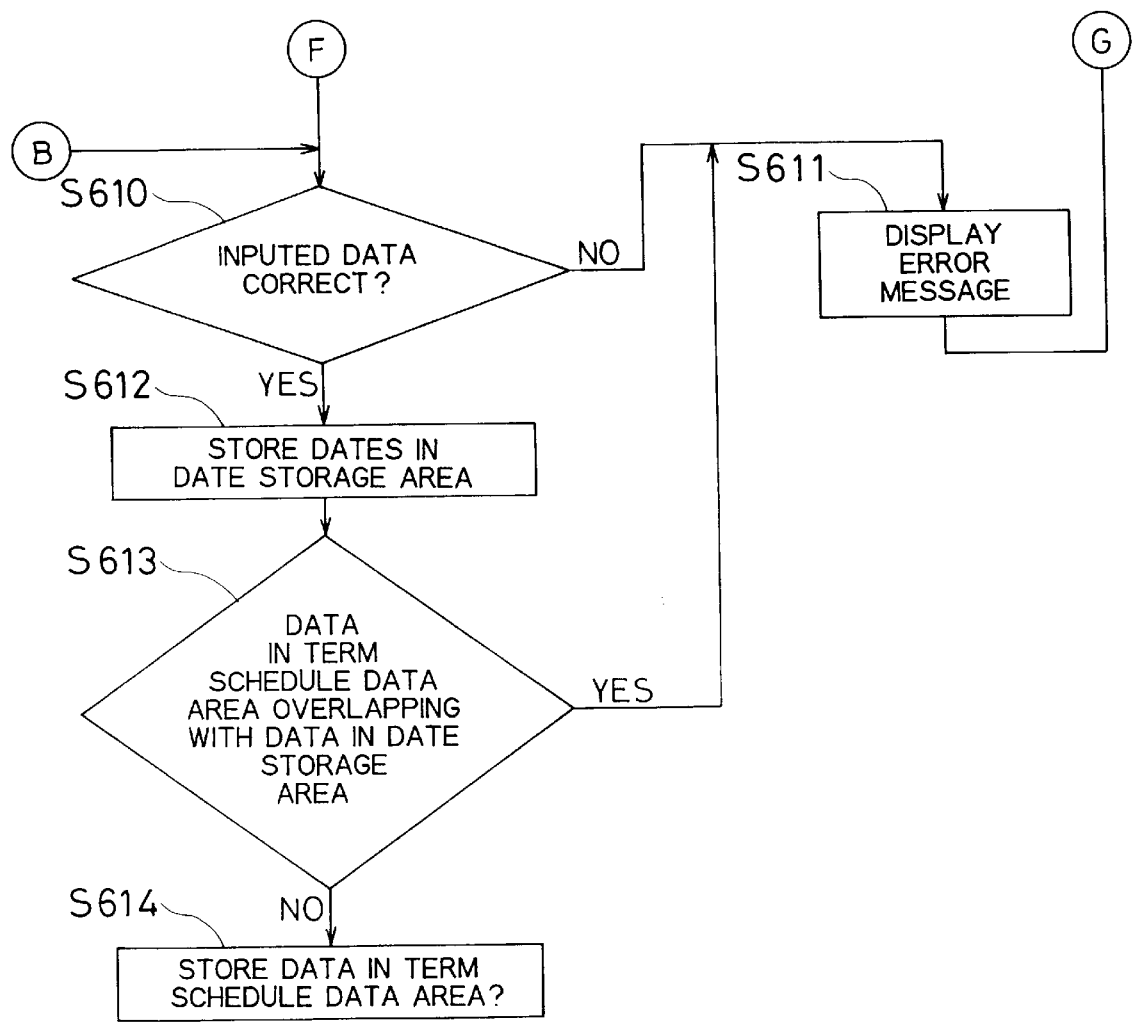

(6) Next, an explanation will be given on a process of setting the term for a certain day of the week. This process involves storing the contents of a plan for a specific day of the week or days of the week during a predetermined term by a single input. The operations of the process will hereafter be explained by means of the flowchart shown in FIGS. 8a and 8b. In this instance, the explanation will be given on an exemplifying case where the plan of "an English conversation class from 18:00 every Wednesday from May 10, 1995 to Oct. 31, 1995" will be inputted.

Step S601

When the procedure goes through the steps S101 to S10A shown in the flowchart of FIG. 5 to display the calendar of May as shown in FIG. 14 and the user indicates with a pen the coordinates of a button for switching from displaying the calendar of May to inputting a term schedule for a specific day of the week, the X-Y coordinates of the indicated position will be detected by the tablet control section 4 and sent to the coordinate storage area 115.

Steps S602 to S604

Figure 17:
FIG. 17 is an explanatory view showing a display state in the embodiment.

The CPU 8 then converts the coordinates into a command for prompting an input of the term schedules for a specific day of the week by means of the coordinate-command converter section 803 by making a reference to the coordinate data area 104. After this screen has been displayed by means of the calendar display section 804, the CPU sets the switching flag 118 on for setting the screen for inputting a day of the week term schedule. On inspecting the flag 118, the CPU displays the screen for inputting term schedules for a specific day of the week by means of the liquid crystal display section 201, as shown in FIG. 17. The procedure then returns to the step S601 for awaiting next input of coordinates.

Steps S605 to S606

The user then designates the coordinates of "Wednesday" on the displayed screen shown in FIG. 17. A plurality of such days of the week may be designated. The days of the week are stored, for example, by means of codes from 0 to 6 corresponding to Sunday through Saturday, respectively. When the day of the week designated on the displayed screen is Wednesday, the CPU stores the code "3" of Wednesday at the head portion (day of the week storage portion) of the term schedule buffer area 117. At the head portion, there are seven sites for storing seven days of a week. If a plurality of days of the week are designated, they are stored, for example, in the order of input.

Steps S607 to S608

The user then inputs, by means of the input and output section 2, the time and the plan of the schedule "an English conversation class from 18:00 every Wednesday from May 10, 1995 to Oct. 31, 1995" and designates with the pen the coordinates of finishing the setting operation. The designated coordinates are then converted into a command for storing the data, whereby the start day of the term, the end day of the term, and the contents of the plan are stored in this order in the step S606.

Step S609

After the data input is finished, the procedure goes to the process for completing the input by, for example, designation of the coordinates of a "registration" button on the day of the week term schedule input screen, as shown in FIG. 17.

Steps S610 to S612

The CPU then judges whether the contents inputted in the step of S607 have insufficiencies or errors in completing the day of the week term schedule (setting of the day of the week, dates, and the like). If such insufficiencies or errors are found, the CPU displays a message therefor. If the input is correct, the CPU stores the dates in the date storage area 116 for performing a comparison in the next step.

Step S613

Then, the comparison section 801 compares the data in the schedule data area 111 with the data in the term schedule buffer area 117 so as to find out whether the plan from 18:00 every Wednesday in the term from May 10, 1995 to Oct. 31, 1995 designated in the step S607 overlaps with another plan or not. If an overlapping plan is found, the CPU displays the corresponding date, the contents of the plan, and the message stating the duplication and tells the user that the plan of English conversation class from 18:00 cannot be stored on that Wednesday (Step S611).

In such a case, the CPU may display the two alternative plans to allow the user to decide which of the two plans should be stored.

Step S614

If no overlapping plan is found as a result of the comparison, the CPU stores the data in the term schedule data area 112 in accordance with, for example, the storage format of FIG. 4.

Figure 9A:
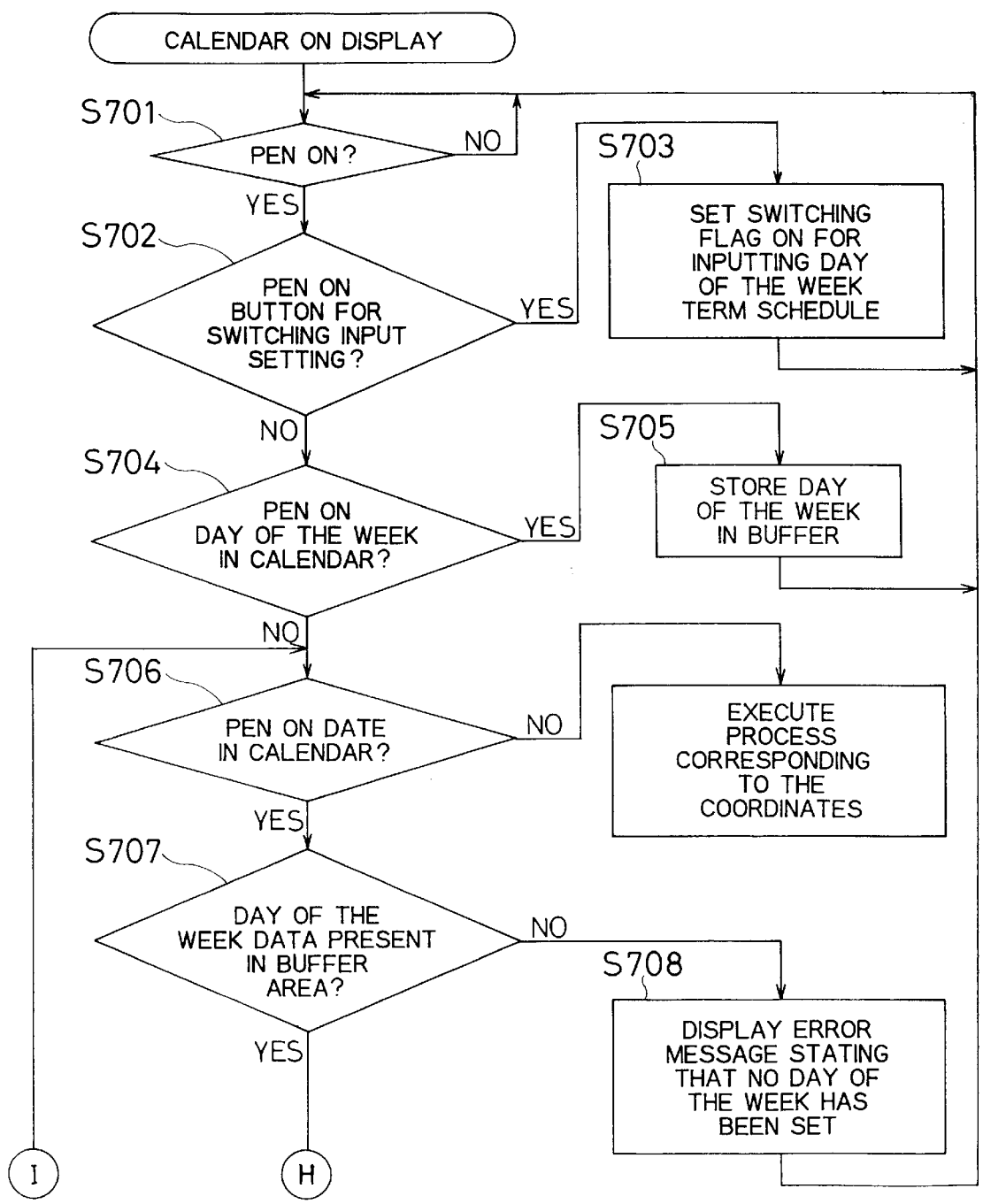
FIGS. 9a and 9b are a flowchart showing a process for setting a term for days of the week when a calendar is displayed in the embodiment.
Figure 9B:
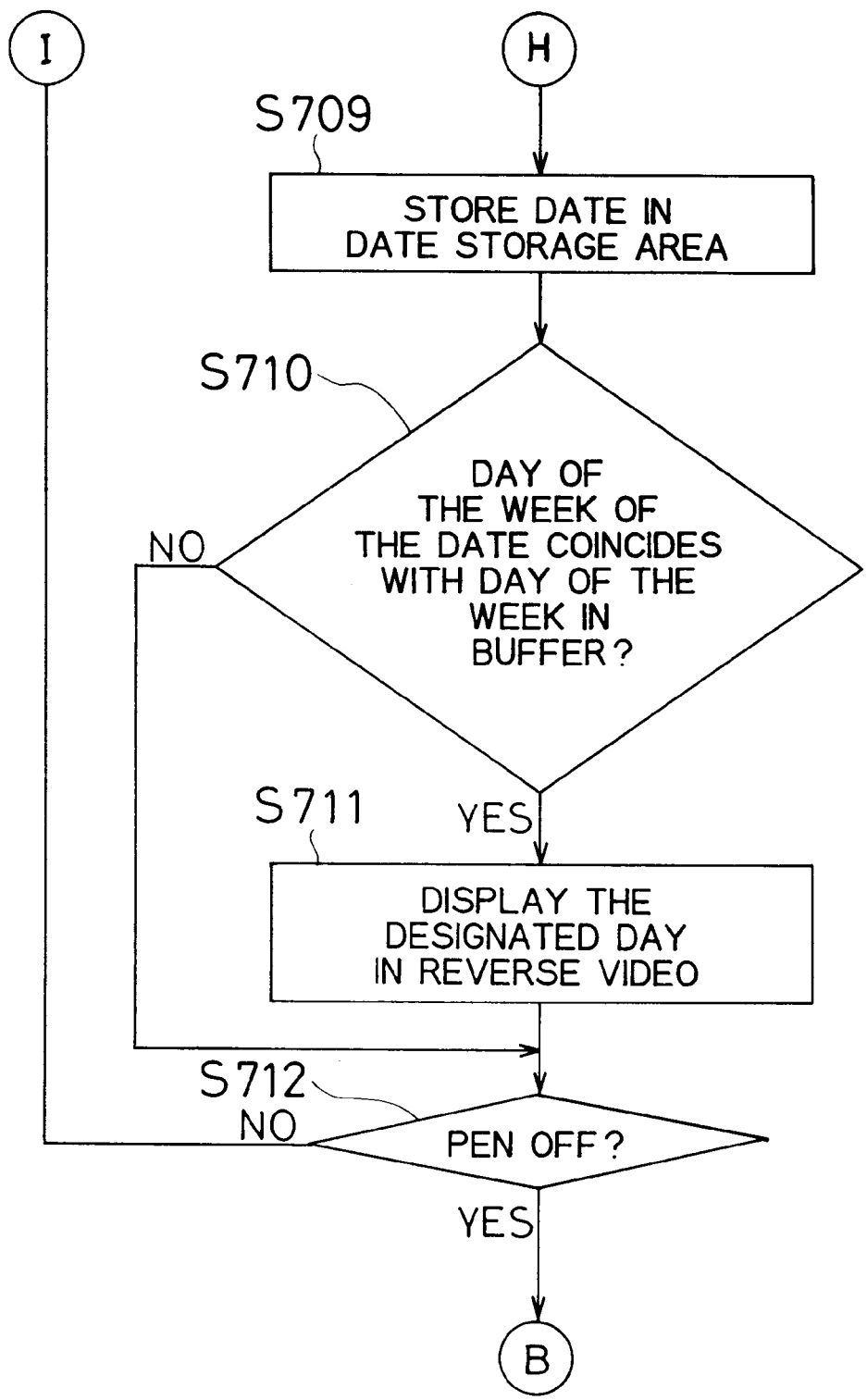

(7) Next, an explanation will be given on a process for setting a day of the week term schedule on a calendar screen. This process involves setting the day of the week term schedule by using coordinates on a calendar screen. The operations of the process will hereafter be explained by means of the flowchart shown in FIGS. 9a and 9b.

Steps S701 to S702

The procedure goes through the steps S101 to S10A shown in the flowchart of FIG. 5 to display the calendar of May as shown in FIG. 14, and the user indicates with a pen the coordinates of a button for switching from displaying the calendar of May to inputting a term schedule for a specific day of the week.

Step S703

The X-Y coordinates of the indicated position will be detected by the tablet control section 4 and sent to the coordinate storage area 115. The CPU 8 then judges, by making a reference to the coordinate data area 104, that the coordinates are for switching the inputs, whereby the CPU sets the switching flag 118 on.

Steps S704 to S705

Subsequently, when the coordinates for "Wednesday" are indicated with a pen on the days of the week in the displayed calendar, the code of Wednesday, for example, "3" will be stored in the buffer area 113 in the same manner as in the step S606.

Steps S706 to S708

When a portion displaying May 10 on the transparent tablet 204 is indicated with a pen, the CPU stores the date of May 10, 1995 in the date storage area 116 and confirms whether there is a day of the week data stored in the buffer in the steps from S704 to S705. If no day of the week data is found, the CPU displays an error message stating that no day of the week has been set. The procedure then goes back to the Step S701 for awaiting the designation of coordinates with a pen.

Steps S709 to S710

By means of the comparison section 801, the date of May 10 designated by coordinates and stored in the date storage area 116 is then compared with the code of Wednesday stored in the buffer area 113 in the step S705 to confirm their correspondence.

If their correspondence is confirmed (i.e. if the designated date of May 10 is confirmed to fall on Wednesday stored in the buffer area 113) in the step S710, the position of May 10 of the date designated by coordinates is displayed in reverse video.

Step S712

If, on the other hand, their correspondence is not confirmed by the comparison in the step S710, the procedure goes to judgement of whether the pen has been released or not (i.e. whether the continuous input has been finished). If the pen has not been released, the procedure successively returns to the steps from S701 to S711 again.

The steps S701 to S711 will be repeated and, when the pen is released from the transparent tablet 204 at the coordinates of October 31, the date of October 31 will be stored in the date area 116. The procedure then goes back to the step S610 to complete the input of the day of the week term schedule.

(8) Next, an explanation will be given on the process of automatically setting the end day in setting the term on a screen displaying a calendar. When the start day and the end day of the set term for the term schedule are to be displayed in reverse video and if the last designated coordinates are not on a date, this process involves setting, as the end day, the date designated before the pen moves to the coordinates other than a date. The operations of the process will hereafter be explained by means of the flowchart shown in FIGS. 7a and 7b. In this instance, the explanation will be given on an exemplifying case where the input is finished at coordinates other than a date in setting the term from May 30 to Jun. 3, 1995.

Figure 7A:
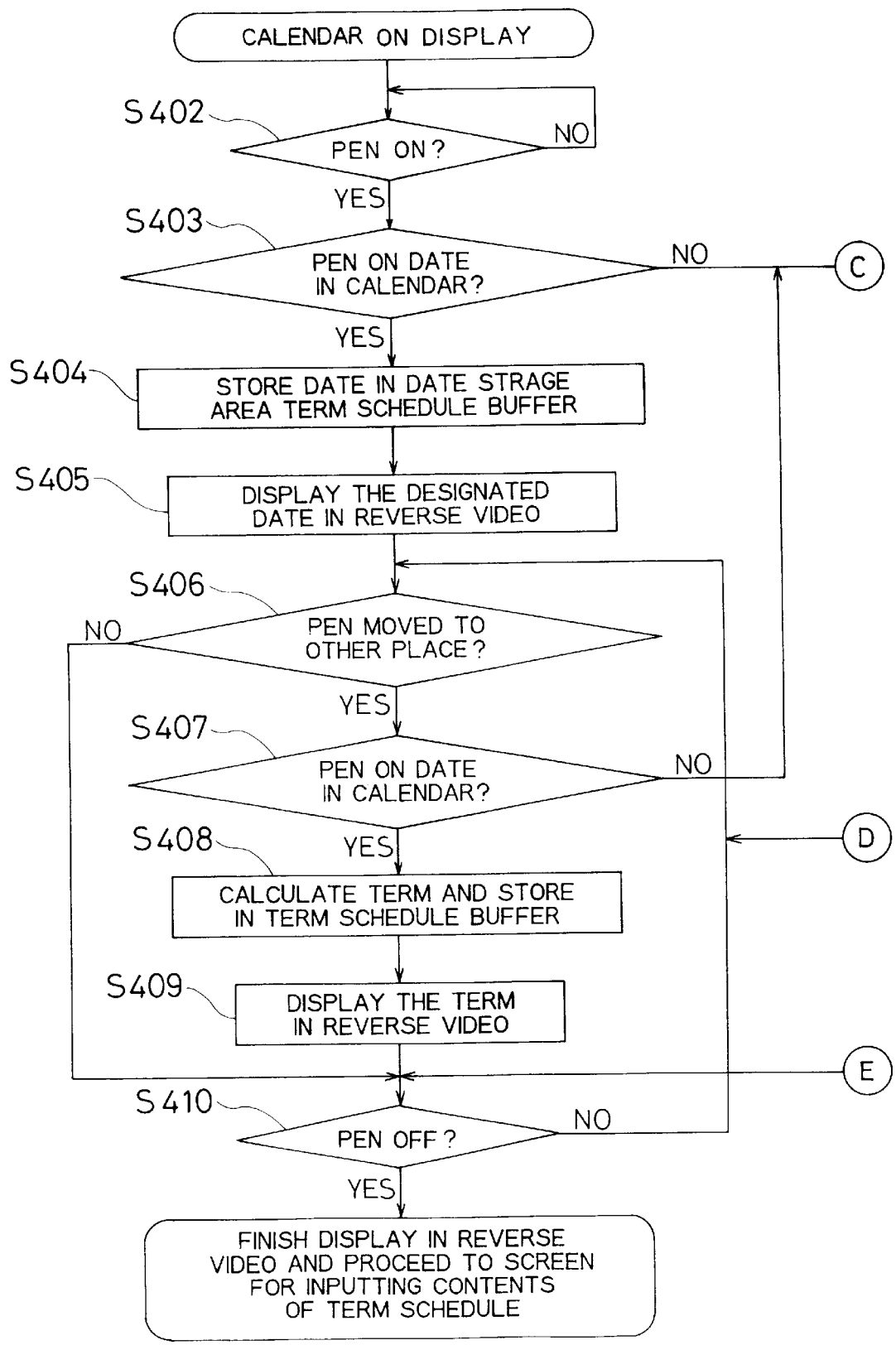
FIGS. 7a and 7b are a flowchart showing a process for setting a term when a calendar is displayed in the embodiment.
Figure 7B:
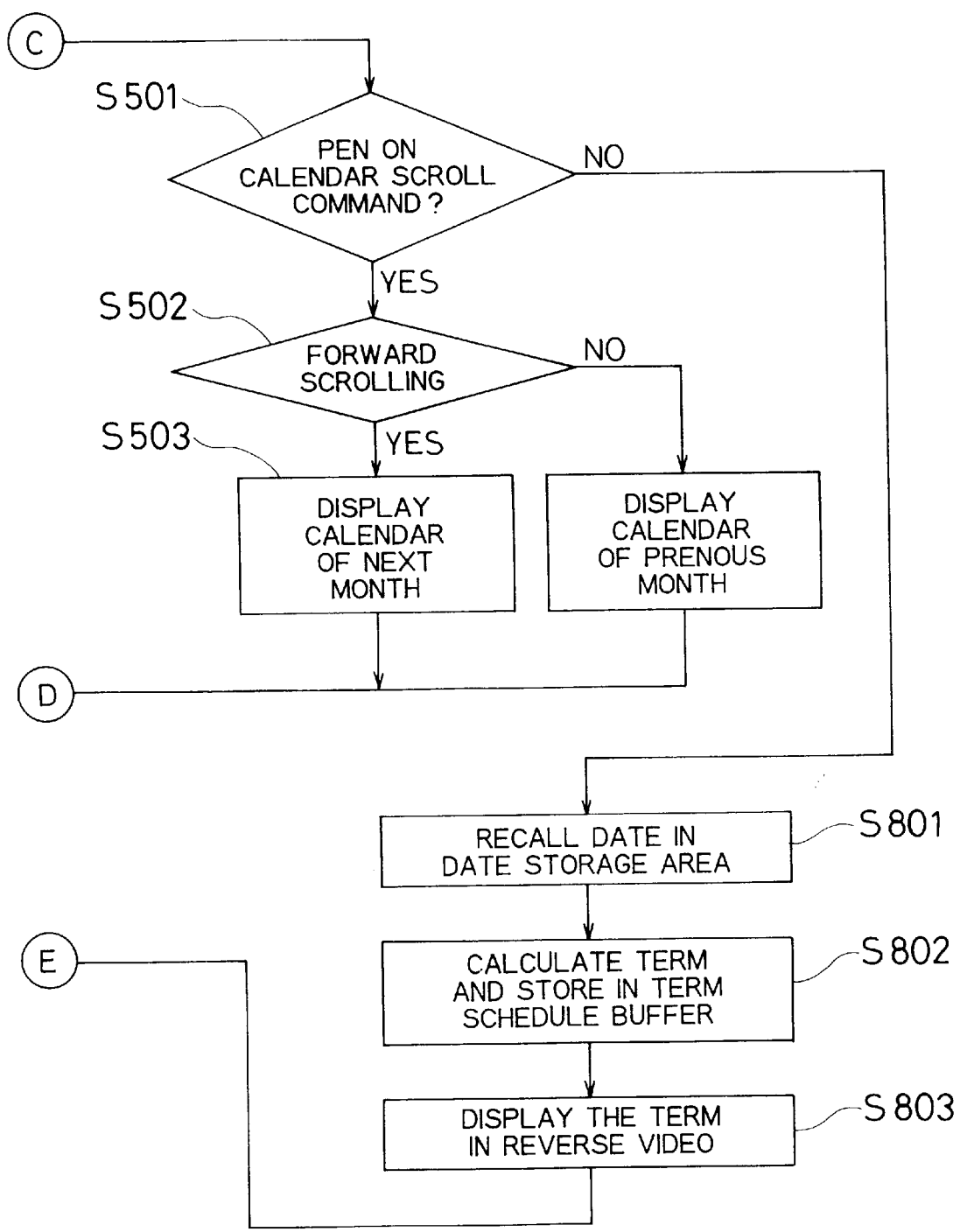

The procedure goes through the steps S401 to S407 along the same flow in the flowchart of FIGS. 7a and 7b.

Step S801

If the pen moves excessively and passes over to the right of the coordinates for the date of June 3 after the date of June 3 has been designated by continuous movement of coordinates with the pen, the CPU judges whether the present coordinates are on a date in a calendar in the step S407. If the present coordinates are not on a date in a calendar, the CPU further judges whether the present coordinates are on a scroll command or not. In this instance, since the coordinates are not on a scroll command, the last designated date will be recalled from the date storage area 116 in which the last designated date is stored.

Step S802

Then, the calculation section 802 of the CPU 8 calculates the dates included between the start day of May 30, 1995 stored in the term schedule buffer 117 in the step S404 and the date of Jun. 3, 1995 which is stored in the date storage area 116 and renewed in the step S407. The calculated dates are then stored in the term schedule buffer 117.

Step S803

The coordinate-command converter section 803 of the CPU 8 converts the date data stored in the term schedule buffer 117 into coordinate data and displays the screen region of the dates in reverse video by means of the liquid crystal display section 201.

Step S410

Then, the CPU judges whether the pen has been released from the transparent tablet 204 and, when the pen has been released, the designation of the coordinates will be finished and the process of displaying in reverse video will be finished as well, whereby the screen will be changed into that of inputting the contents of the term schedule.

Thus, the present invention provides the following effects.

When a schedule is displayed on a screen for displaying schedules for one day and if the designated day is within the term schedule, the CPU displays not only the fact that the designated day is within the term schedule but also the term from the start day of the plan to the end day of the plan, so that the user can immediately confirm the schedule without returning to the screen for displaying a calendar of one month, whereby easy grasp of the schedule can be provided.

In addition, since it is possible to display the contents of the schedule as well as the term of the schedule, the user can immediately confirm the contents of all the schedules of the day by looking at one screen (i.e. what plans are present as a term schedule on the day) without returning to the screen displaying a calendar of one month, whereby the efficiency of schedule management can be increased.

Also, when schedules are displayed on a screen displaying a weekly schedule and if any day of the designated week is included in the term of the term schedule, the CPU displays not only the fact that the day is within the term schedule but also the term and the contents of the plan, so that the user can immediately confirm the schedule by looking at one screen without returning to the screen displaying a calendar of one month, whereby easy grasp of the schedule can be provided and the efficiency of schedule management can be increased.

Also, when the date of starting the inputs of coordinates and a date during the input are separated in setting the term by continuous input of coordinates, the CPU displays the designated days in reverse video, so that it is easy for the user to visually confirm the region designated by the input, whereby the probability of misinputs and mistakes of inputs can be considerably reduced.

Further, since it is possible to set a term by scrolling the calendar screens by one continuous input of coordinates, the efficiency of inputting term schedules lying across a plurality of months can be greatly increased.

Moreover, since it is possible to input, at a time, a schedule for specific day(s) of the week included in a predetermined term, the labor of inputting the schedule day by day can be saved if the schedule to be set extends over a long term, whereby the inputting efficiency can be greatly increased.

In addition, since it is possible to set the term of a schedule for specific day(s) of the week within a predetermined term by means of continuous input of coordinates and to display the specific day(s) of the week from the starting position of coordinates in reverse video, it is easy for the user to visually confirm the region designated by the input and the specific day(s) of the week, whereby the probability of misinputs and mistakes of inputs can be considerably reduced.

Also, when the start day and the end day of the set term for the term schedule are to be displayed in reverse video and if the last designated coordinates are not on a date, the CPU sets, as the end day, the date designated before the pen moves to the coordinates other than a date, so that, if the designation of coordinates are mistakenly finished at a position other than a date, no error condition will be generated and the input can be completed, whereby the labor of setting the term again can be saved and the inputting efficiency can be increased.

According to the present invention, if a specific date is designated and the designated date is included in a term of a term data, the start day and the end day of the term data are displayed, so that the user can immediately confirm the schedule without returning to the screen displaying a calendar of one month, whereby easy grasp of the schedule can be provided.

What we claim is:

1. A schedule management apparatus comprising:
   term data input means for inputting term data by designating a start day and an end day;
   schedule input means for inputting a schedule corresponding to the term data inputted by the term data input means;
   storage means for storing the term data and the schedule in correspondence;
   day designation means for designating a specific day;
   retrieval means for retrieving, from the storage means, any term data including the specific day designated by the day designation means; and
   schedule display means for displaying a one-day schedule for the specific day designated by the day designation means, wherein the one-day schedule identifies at least the start day and the end day of the term data retrieved by the retrieval means.

2. A schedule management apparatus of claim 1, wherein the schedule display means further displays a content of a schedule corresponding to the term data retrieved by the retrieval means.

3. A schedule management apparatus of claim 1, further comprising a week designation means for designating a specific week, wherein
   the retrieval means further performs a function of retrieving, from the storage means, any term data included in the specific week designated by the week designation means, and
   the schedule display means further displays a weekly schedule for the specific week designated by the week designation means, wherein the weekly schedule identifies the interval between the start day and the end day of the term data retrieved by the retrieval means and the contents of the schedule during the interval.

4. A schedule management apparatus of claim 1, further comprising a calendar display means for displaying a calendar and a scroll means for scrolling the displayed calendar, wherein the term data input means further performs a function of inputting a term between a start day and an end day as continuous term data even if the scrolling means performs scrolling during a period between designation of the start day and designation of the end day.

5. A schedule management apparatus of claim 1, further comprising a day of the week designation means for designating a specific day of the week, wherein the schedule input means further performs a function of inputting only the schedule corresponding to the specific day of the week within the term data inputted by the term data input means.

6. A schedule management apparatus comprising:
- an input section for inputting term data comprising a start day and an end day, a plan for the term defined by the term data, and day designation data;
- a memory for storing the term data and the plan for the term;
- a display for selectively displaying a monthly schedule and a daily schedule; and
- a control circuit responsive to day designation data which designates a day in the term defined by the term data for causing said display to display a daily schedule for the designated day, wherein the daily schedule for the designated day identifies at least the start day and the end day of the term to thereby identify an overlap between the designated day and the term.

7. The schedule management apparatus according to claim 6, wherein said display is one of the group consisting of: a CRT display, a liquid crystal display, an EL display and a plasma display.

8. The schedule management apparatus according to claim 6, wherein said control circuit causes said display to further display the plan for the term.

9. The schedule management apparatus according to claim 6, wherein week designation data is input via said input section and said display selectively displays a weekly schedule, said control circuit being responsive to week designation data which designates one or more days in the term defined by the term data for causing said display to display a weekly schedule for the designated week, wherein the weekly schedule for the designated week identifies at least the start day and the end day of the term to thereby identify an overlap between the designated week and the term.

10. The schedule management apparatus according to claim 6, wherein said input section and said display are provided by a touch sensitive screen.

11. The schedule management apparatus according to claim 6, wherein the start day and the end day of the term data designate a term including the start day, the end day and the days, if any, between the start day and the end day.

12. The schedule management apparatus according to claim 6, wherein day of the week designation data for designating a specific day of the week is input via said input section and the term defined by the start day and the end day of the term data includes only those occurrences of the specific day of the week in the term.

13. A schedule management apparatus comprising:
- a display for displaying a calendar;
- an input section configured for the user-input of term data comprising a start day and an end day and a plan for the term defined by the term data, wherein said input section is further configured to permit continuous input of coordinates via the calendar displayed on said display to designate the start day and the end day for the term;
- a memory for storing the term data and the plan for the term; and
- a control circuit configured to be responsive to the continuous input of coordinates to designate the start day and the end day of a new term and to control said display to display in reverse video any days of the new term which overlap with the term stored in said memory.

14. The schedule management apparatus according to claim 13, wherein said display and said input section are provided by a touch sensitive screen.

15. A schedule management apparatus comprising:
- a touch sensitive screen configured for the user-input of term data comprising a start day and an end day, a plan for the term defined by the term data, and day designation data, and said touch-sensitive screen being further configured for the selective display of a monthly schedule and a daily schedule;
- a memory for storing the term data and the plan for the term; and
- a control circuit configured to be responsive to day designation data which designates a day in the term defined by the term data and to cause said display to display a daily schedule for the designated day which identifies at least the start day and the end day of the term to thereby identify an overlap between the designated day and the term.

16. The schedule management apparatus according to claim 15, wherein
- said touch-sensitive screen is further configured for the user-input of week designation data, and for the selective display of a monthly schedule, a weekly schedule and a daily schedule, and
- said control circuit is further configured to be responsive to week designation data which designates one or more days in the term defined by the term data and to cause said touch-sensitive screen to display a weekly schedule which identifies at least the start day and the end day of the term to thereby identify an overlap between the designated week and the term.

* * * * *